United States Patent
Gan et al.

(10) Patent No.: US 9,934,180 B2
(45) Date of Patent: Apr. 3, 2018

(54) SYSTEM AND METHOD FOR COMMUNICATING WITH AND FOR CONTROLLING OF PROGRAMMABLE APPARATUSES

(71) Applicant: PQJ Corp, Valencia, CA (US)

(72) Inventors: Quan Gan, Valencia, CA (US); Jiali Xu, Valencia, CA (US); Jun Dong, Shanghai (CN)

(*) Notice: Subject to any disclaimer, the term of this patent is extended or adjusted under 35 U.S.C. 154(b) by 0 days.

(21) Appl. No.: 14/668,761

(22) Filed: Mar. 25, 2015

(65) Prior Publication Data

US 2015/0278137 A1    Oct. 1, 2015

Related U.S. Application Data

(60) Provisional application No. 61/970,591, filed on Mar. 26, 2014.

(51) Int. Cl.
| | |
|---|---|
| *G06F 3/00* | (2006.01) |
| *G06F 13/42* | (2006.01) |
| *G06F 13/36* | (2006.01) |
| *G06F 13/38* | (2006.01) |
| *H04L 29/06* | (2006.01) |
| *H04L 29/08* | (2006.01) |

(52) U.S. Cl.
CPC .......... *G06F 13/387* (2013.01); *G06F 13/385* (2013.01); *H04L 29/06068* (2013.01); *H04L 29/08018* (2013.01)

(58) Field of Classification Search
CPC .............................. G06F 13/387; G06F 13/385
USPC ........................................... 710/11, 105, 315
See application file for complete search history.

(56) References Cited

U.S. PATENT DOCUMENTS

| | | | | |
|---|---|---|---|---|
| 4,964,065 A | * | 10/1990 | Hicks | G01D 7/08 324/639 |
| 4,980,887 A | * | 12/1990 | Dively | H04B 17/406 370/246 |
| 5,627,885 A | * | 5/1997 | Paneth | H04B 3/23 375/367 |
| 5,769,527 A | | 6/1998 | Taylor et al. | |
| 6,016,038 A | | 1/2000 | Mueller et al. | |
| 6,150,774 A | | 11/2000 | Mueller et al. | |
| 6,175,201 B1 | | 1/2001 | Sid | |
| 6,181,499 B1 | * | 1/2001 | Hutchins | G11B 5/09 360/53 |
| 6,665,020 B1 | * | 12/2003 | Stahl | H04L 12/40058 348/552 |
| 6,815,842 B2 | | 11/2004 | Fehd et al. | |

(Continued)

FOREIGN PATENT DOCUMENTS

CN       203313466 U      5/2013

OTHER PUBLICATIONS

PCT/US2015/022570 ; Filing Date: Mar. 25, 2015; International Search and the Written Opinion; dated Jun. 16, 2015.

(Continued)

*Primary Examiner* — Farley Abad
*Assistant Examiner* — Henry W Yu
(74) *Attorney, Agent, or Firm* — Patent Law Agency, LLC; Peter Ganjian

(57) ABSTRACT

The present invention discloses a system and a method for communication and control between incompatible devices that operate in accordance with different protocols without hardware modification and without requirement of a dedicated hardware.

27 Claims, 23 Drawing Sheets

(56) References Cited

U.S. PATENT DOCUMENTS

| | | | |
|---|---|---|---|
| 6,931,231 B1 | 8/2005 | Griffin | |
| 6,976,448 B2 | 11/2005 | Morgan et al. | |
| 7,228,190 B2 | 6/2007 | Dowling et al. | |
| 7,324,836 B2 | 1/2008 | Steenstra et al. | |
| 7,332,877 B2 | 2/2008 | Crodian | |
| 7,401,162 B2 * | 7/2008 | Baker | H04L 69/18 709/250 |
| 7,427,840 B2 | 9/2008 | Morgan et al. | |
| 7,450,085 B2 | 11/2008 | Thielemans et al. | |
| 7,835,809 B2 | 11/2010 | Griffin, Jr. | |
| 7,868,562 B2 | 1/2011 | Salsbury et al. | |
| 7,994,732 B2 | 8/2011 | Zulch | |
| 8,035,320 B2 | 10/2011 | Sibert | |
| 8,115,407 B2 | 2/2012 | Chang et al. | |
| 8,179,161 B1 * | 5/2012 | Williams | H03K 19/01759 326/82 |
| 8,279,079 B2 | 10/2012 | Bergman et al. | |
| 8,299,721 B2 | 10/2012 | Smith | |
| 8,386,266 B2 | 2/2013 | Feng et al. | |
| 8,573,487 B2 | 11/2013 | McKelvey | |
| 8,589,908 B2 | 11/2013 | Gupta et al. | |
| 8,661,429 B2 | 2/2014 | Ruster et al. | |
| 8,922,570 B2 | 12/2014 | Archer | |
| 9,204,519 B2 | 12/2015 | Gan et al. | |
| 2002/0007510 A1 | 1/2002 | Mann | |
| 2004/0212309 A1 | 10/2004 | St-Germain | |
| 2005/0070153 A1 | 3/2005 | Tang | |
| 2005/0075134 A1 | 4/2005 | Steenstra et al. | |
| 2008/0136334 A1 | 6/2008 | Robinson et al. | |
| 2009/0024865 A1 | 1/2009 | Fugaro et al. | |
| 2009/0085500 A1 | 4/2009 | Zampini, II et al. | |
| 2009/0219305 A1 | 9/2009 | Diederiks et al. | |
| 2010/0184479 A1 * | 7/2010 | Griffin, Jr. | H04B 1/034 455/557 |
| 2010/0283894 A1 * | 11/2010 | Horan | H04L 25/02 348/441 |
| 2011/0035029 A1 | 2/2011 | Yianni | |
| 2011/0109228 A1 | 5/2011 | Shimomura et al. | |
| 2011/0131356 A1 * | 6/2011 | Devam | G06F 13/426 710/105 |
| 2011/0137757 A1 | 6/2011 | Paolini et al. | |
| 2011/0144778 A1 | 6/2011 | Fung et al. | |
| 2011/0153885 A1 | 6/2011 | Mak et al. | |
| 2011/0234119 A1 | 9/2011 | Zulch | |
| 2012/0008851 A1 | 1/2012 | Pennock et al. | |
| 2012/0013255 A1 | 1/2012 | Young | |
| 2012/0026019 A1 | 2/2012 | Lin et al. | |
| 2012/0086345 A1 | 4/2012 | Tran | |
| 2012/0126722 A1 | 5/2012 | Archdale | |
| 2012/0169249 A1 | 7/2012 | Loveland et al. | |
| 2012/0225645 A1 | 9/2012 | Sivan | |
| 2012/0231837 A1 | 9/2012 | Hilbrink et al. | |
| 2012/0236160 A1 | 9/2012 | Rezek | |
| 2012/0290742 A1 | 11/2012 | Sun et al. | |
| 2013/0018240 A1 | 1/2013 | McCoy | |
| 2013/0073058 A1 | 3/2013 | Wei et al. | |
| 2013/0130743 A1 | 5/2013 | Lin | |
| 2013/0134891 A1 | 5/2013 | Woytowitz | |
| 2013/0147367 A1 | 6/2013 | Cowbum | |
| 2013/0207481 A1 | 8/2013 | Gobburu et al. | |
| 2013/0221872 A1 | 8/2013 | Gan et al. | |
| 2013/0249429 A1 | 9/2013 | Woytowitz et al. | |
| 2013/0264943 A1 | 10/2013 | Bora et al. | |
| 2013/0271004 A1 | 10/2013 | Min et al. | |
| 2014/0019653 A1 | 1/2014 | Amchislavsky et al. | |
| 2014/0266340 A1 * | 9/2014 | Huang | G06F 1/04 327/156 |
| 2014/0269881 A1 * | 9/2014 | He | H04L 25/03343 375/231 |
| 2014/0285090 A1 | 9/2014 | Chemel | |
| 2015/0145435 A1 | 5/2015 | Ogawa | |
| 2015/0278137 A1 | 10/2015 | Gan | |
| 2016/0330819 A1 | 11/2016 | Leadford | |
| 2017/0027045 A1 | 1/2017 | Chemel | |
| 2017/0223807 A1 | 8/2017 | Recker | |
| 2017/0223811 A1 | 8/2017 | Vangeel | |

OTHER PUBLICATIONS

Color Kinetics, Philips; ZAP1 1.5 Brouchure 2005; http://colorkinetics.com/patents/.

http://www.ronex.ee/; image of a conventional 35 mm stereo plug to 39 screw terminal—DC Connector and plug.

ENTTEC control products ;—open DMX ethernet ODE ; www.enttec.com; 2013.

Luminair for iOS Digital Lighting control for iPad, iPhone, ; http://synthe-fx.com/products/luminair; 2008.

Microchip PIC12(L)F1822/PIC16(L)F1823 Data Sheet—2010.

www.beyondlogic.org ; USB in a NutShell—Chapter 2—Hardware ; Sep. 17, 2010.

Boobox controller ; www.frightideas.com/booboxes/boobox-flexmax.html; inventor Travis Cook (fightideas); product name: BooBox.

Inventor: Gantom (Quan Gan) ; Date: Jan. 2012 ; Gantom DarkBox RePlay; http://www.gantom.com/controllers/darkbox-replay/.

Online Retailers with RGB remote controllers: https://www.walmart.com/ip/PLATINUM-Small-Remote-Controller-for-RGB-LED/37563144 https://www.amazon.com/Button-Wireless-LED-Controller-LEDwholesalers/dp/B003WJ5PVK https://www.amazon.com/SUPERNIGHT-Remote-Controller-Light-Strip/dp/B00AF5YOK2.

PCT/US2015/022571; Filing Date: Mar. 25, 2015 ; International Preliminary Report on Patentability—Oct. 6, 2016.

U.S. Appl. No. 15/423,566, filed Feb. 2, 2017; File History ; Office Action dated Aug. 30, 2017.

* cited by examiner

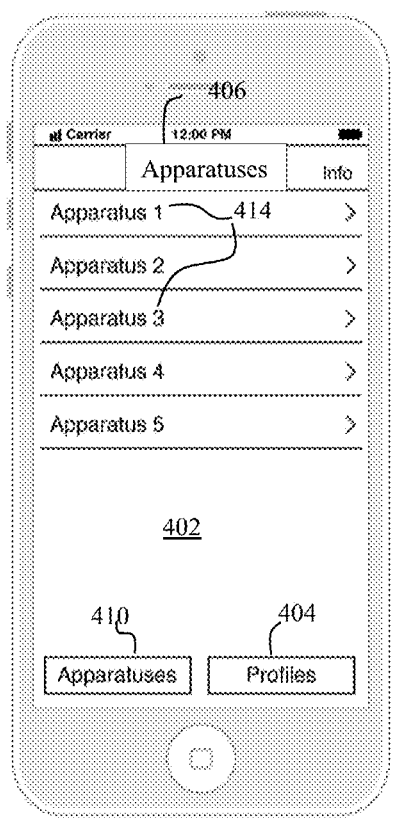 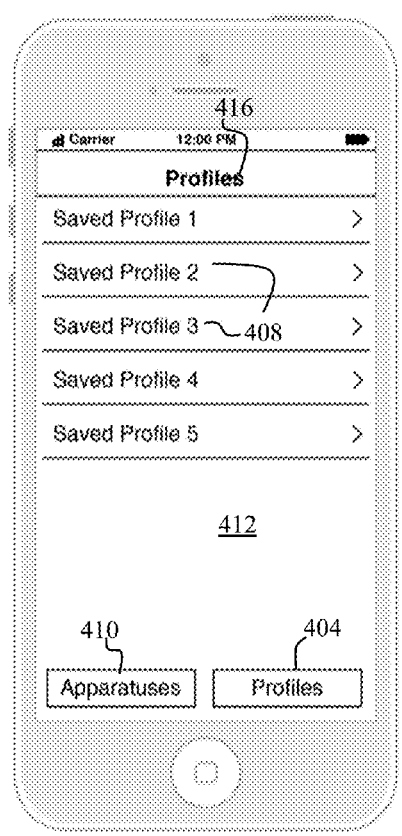
FIG. 3B-1  FIG. 3B-2

Generic Configuration Sync Packet

| ID Sync Packet | ID Sync Packet Type | Error checking |
|---|---|---|
| Header | Payload | Trailer |

Generic Configuration Control Packet

| ID Control Packet | Data | Error checking |
|---|---|---|
| Header | Payload | Trailer |

| | A/V | Multichannel Serial Output |
|---|---|---|
| Tip | Left | Serial Signal 1 |
| Ring | Right | Serial Signal 2 |
| Ring | GND | Common |
| Sleeve | Video | Serial Signal 3 |

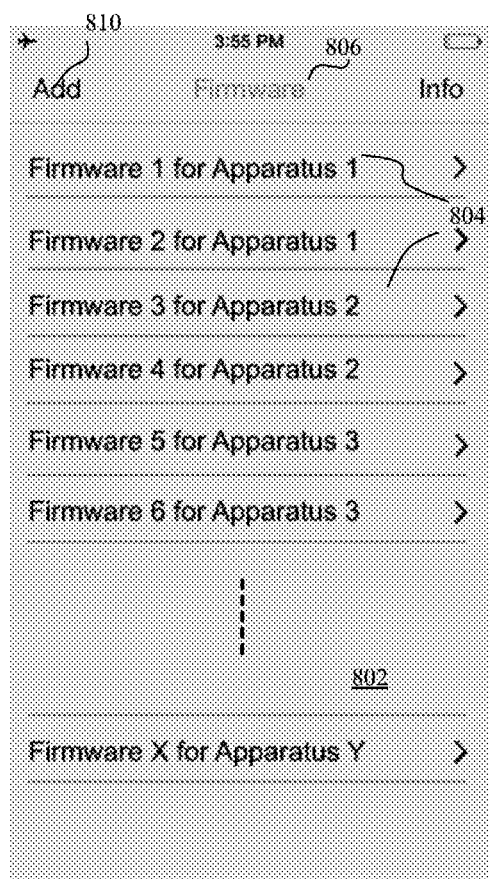 
FIG. 8B-1    FIG. 8B-2

Distinct Sync Packet

| ID Sync Packet | ID Sync Packet Type | Error checking |
|---|---|---|
| Header | Payload | Trailer |

Distinct Control Packet

| ID Control Packet | Data | Error checking |
|---|---|---|
| Header | Payload | Trailer |

SYSTEM AND METHOD FOR COMMUNICATING WITH AND FOR CONTROLLING OF PROGRAMMABLE APPARATUSES

CROSS-REFERENCE TO RELATED APPLICATIONS

This Application is Non-Provisional Application that claims the benefit of priority of the U.S. Provisional Utility Patent Application 61/970,591 with a filing date 26 Mar. 2014, the entire disclosures which is expressly incorporated by reference in its entirety herein. It should be noted that where a definition or use of a term in the incorporated patent application is inconsistent or contrary to the definition of that term provided herein, the definition of that term provided herein applies and the definition of that term in the incorporated patent application does not apply.

BACKGROUND OF THE INVENTION

1. Field of the Invention

One or more embodiments of the present invention relate to a method and a system for reconciling incompatibilities between programmable devices for connectivity, communication, and control (including exchange or transmission of data) between incompatible programmable devices without hardware modifications (if any). More particularly, a method and a system is provided for communicating with and for controlling of programmable apparatuses using computing devices such as desktops, mobile computing devices, etc. that communicate with and control a programmable apparatus via a physical interface (such as a physical port) of the computing device.

2. Description of Related Art

Use of mobile computing devices (e.g., a mobile phones, etc.) for wireless communication with Digital Multiplexer (DMX-512) lighting fixtures are well known and have been in use for a number of years. DMX-512 based mobile application (or DMX mobile "app") for the DMX-512 lighting fixture allow wireless transmission of wireless signals by a mobile computing device to be transmitted via a WI-FI™ connection to a dedicated WI-FI™ router, which receives and converts the wireless WI-FI™ signals into Ethernet signals. The dedicated WI-FI™ router transmits the Ethernet signal by a physically connected wire to a dedicated DMX-512 signal converter that is also physically wire connected to one or more DMX-512 based lighting fixtures. The DMX-512 signal converter is a well-known specialty device that is designed to convert Ethernet signals received from the wireless dedicated WI-FI™ router into DMX-512 signals.

A drawback with conventional wireless systems using a mobile computing device for wireless control of a Digital Multiplexer (DMX-512) lighting fixture is that it requires at least two additional pieces of hardware between the mobile computing device and the DMX-512 light fixture, which are the dedicated WI-FI™ router and the dedicated DMX-512 signal converter, including their respective connections to one another and source of power supply. A further drawback with the wireless DMX system using a mobile computing device is that it requires initial setup (or configuration) of and between the mobile computing device, the dedicated WI-FI™ router, and the dedicated DMX-512 signal converter for exclusive communication with one another.

A conventional wireless system using a mobile computing device mentioned above require a dedicated WI-FI™ router for an associated mobile computing device to ensure reliability and signal throughput of the router. DMX-512 lighting fixtures require and use large signal bandwidth for proper operation and hence, the use of a dedicated WI-FI™ router for a specifically associated mobile computing device would prevent and exclude other mobile computing devices from using and routing signals through the router, which may reduce router bandwidth available and needed by the fixture and the associated mobile computing device. Accordingly, dedicated WI-FI™ router would allow only a recognized or associated mobile computing device (through the initial setup) to communicate with the dedicated WI-FI™ router to ensure reliability and signal throughput of the router. It should be noted that use of unrelated WI-FI™ within the same space may also decrease bandwidth due to interference.

Further, most conventional wireless systems using a mobile computing device for wireless control of a DMX-512 lighting fixture do not have the capability to field upgrade (or update or change) a built-in firmware of the DMX-512 lighting fixture via its DMX-512 interface. In fact, changing the firmware of a DMX-512 fixture is generally not done as most of the firmware memory devices used therein are fixed installed and cannot be changed after manufacture and further, no communication protocol exists to field-update or change or modify a built-in firmware of the DMX-512 lighting fixture using its DMX-512 interface.

Other wireless DMX systems exist that do not require WI-FI™, but instead, require a transmitter plugged into the controller and a receiver plugged into lighting fixture. This basically replaces the physical cable with a wireless link. Even with this setup two separate pieces of hardware with two power source connections is required.

Furthermore, traditional DMX-512 devices have embedded user interfaces such as buttons and/or displays for configuration and visual feedback. This takes up a significant amount of physical space and thus constrains the devices to a minimum size greater than of the interface hardware. Further miniaturization of the DMX-512 device is not possible without removing the user interface.

Accordingly, in light of the current state of the art and the drawbacks to current lighting fixture wireless systems that use mobile computing devices mentioned above, a need exists for system and method for communicating with and for controlling of programmable apparatuses using computing devices such as desktops, mobile computing devices (e.g., mobile phones, etc.) that do not use or require a dedicated transmitter/receivers, WI-FI™ router, a dedicated DMX-512 signal converter, and do not need or require an initial setup or configuration for exclusive communications between the components.

BRIEF SUMMARY OF THE INVENTION

A non-limiting, exemplary aspect of one or more embodiments of the present invention provides a method and a system for communication and control between incompatible devices, comprising:

a first device that operates in accordance with a first protocol;

a second device that generally operates in accordance with a second protocol that is different from the first protocol, but commences operations in accordance with the first protocol upon establishment of a direct link between the first and the second devices, which enables the first device to control and transmit control signals to the second device in accordance with the first protocol; and the second device reverts to operating in accordance with the second protocol upon severing of the link between the first and second device, with data of the second device modified by the control signals of the first device.

Another non-limiting, exemplary aspect of one or more embodiments of the present invention provides a method for communication and control between incompatible devices, comprising:

reconciling a rate of transmission of communication and control signal packets in accordance with a first protocol of a first device; and transmitting the communication and control signal packets at voltage levels in accordance with a second protocol of a second device to thereby establish communication and control between incompatible devices without hardware modification and without requirement of a dedicated hardware.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIG. 3A to 3B-8 are non-limiting, exemplary illustrations of a controller application for configuration-control of a programmable apparatus, including a flowchart and a few exemplary screenshots in accordance with one or more embodiments of the present invention;

FIG. 4A is a non-limiting, exemplary flowchart for eventual transmission of sync and control packets by the controller application in accordance with one or more embodiments of the present invention;

FIGS. 4B-1 and 4B-2 are non-limiting, exemplary illustrations of different types of data packets (i.e., sync and control signals) used in accordance with one or more embodiments of the present invention;

FIG. 4C-1 is a non-limiting example of a analog signal (in a analog pseudo-digital signal) of a converted stream of digital packets (control and or sync) in accordance with one or more embodiments of the present invention; and FIGS. 4C-2 and 4C-3 are sampling schemes used to maintain signal integrity in accordance with one or more embodiments of the present invention;

DETAILED DESCRIPTION OF THE INVENTION

Figure 1:
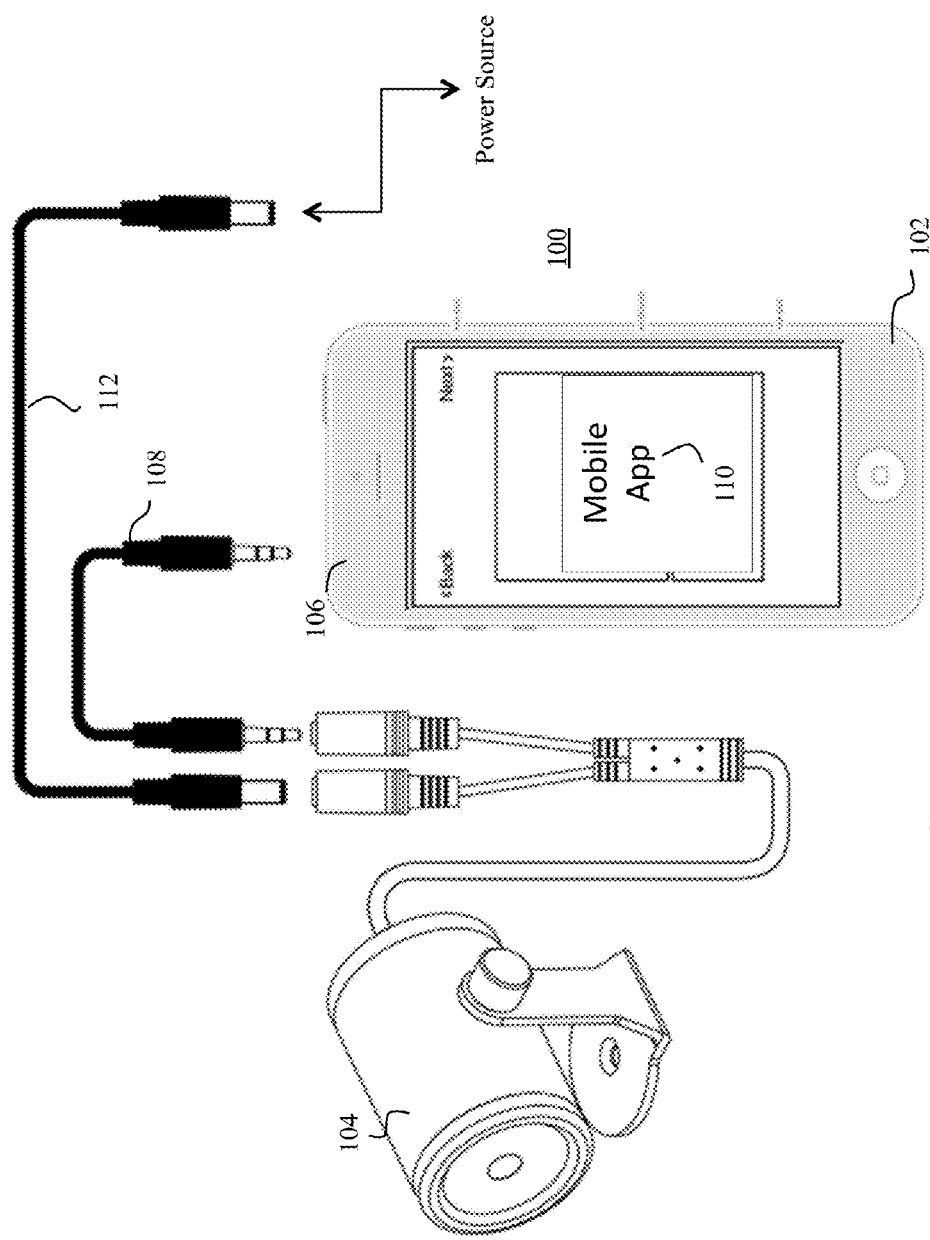
FIG. 1 is a non-limiting, exemplary illustration of a system and a method for direct communication with and for direct control of an exemplary programmable apparatus using a computing device in accordance with an embodiment of the present invention.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart (if a flowchart is used) may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

One or more embodiments of system and method of the present invention provide a user interface that is understandable by human intellect and human senses for interaction. A non-limiting example of a user interface may include a graphic user interface (GUI) to allow a visual way of interacting with the various elements of the present invention. The disclosed user interface provided throughout the disclosure is meant to be illustrative and for convenience of example only and should not be limiting. Therefore, various embodiments of the present invention are not limited to any particular GUI configuration and may be implemented in a variety of different types of user interfaces. Further, all GUI representations of any concepts, aspects, functions, operations, or features may be varied and therefore, none should be limiting. The non-limiting, non-exhaustive illustrations of the GUI used throughout the disclosure are provided only for a framework for discussion. For example, the mere act or function of "selection" (e.g., selecting a programmable apparatus to be controlled, which is detailed below) may be accomplished by numerous GUI configurations or representations of the concept of "selection" that are too numerous to mention individually, non-exhaustive, non-limiting examples of which may include the use of GUI radio-buttons, GUI pull-down menus, individual GUI icons that are tapped or selected, which may direct users to other types of "selection" GUI, a simple list of links that may be tapped or selected and etc. As another simple example, GUI that is used to represent an "Assign" button to assign an address configuration to a DMX-512 based programmable apparatus for example, or some other concept, aspect, function, feature, or operation may be represented by a completely different set of GUI representations (i.e., configurations, shapes, colors, etc.) shown in the present application without limitations and without departing from the spirit and scope of the claims.

Throughout the disclosure, references to programmable fixtures (e.g., lighting fixtures, fog machines, etc.) are meant to be illustrative, are for convenience of example, and are for discussion purposes only. That is, the use of the one or more embodiments of the system and method of the present invention should not be limited to programmable fixtures only but is equally applicable to other programmable apparatuses.

Throughout the disclosure, the term "control," in addition to its plain and ordinary meaning, also encompasses any one or more of addressing, configuration, programming, and/or firmware changes or modifications for a programmable apparatus. Accordingly, for example, a control signal may be a single that may include data in a form of control data packets with respect to address (e.g., addressing control signal), configuration, and/or firmware modification for a programmable apparatus such as, for example, a programmable lighting fixture.

The present invention defines firmware as software or software application (program code and data) programmed into a non-volatile (or persistent) memory (e.g., ROM, EPROM, Flash memory, etc.), which provides specific features or functionalities (e.g., modes of operations). Non-limiting examples of features or functions that may be provided by a typical firmware for a programmable apparatus such as a programmable DMX-512 lighting fixture may include program code and data that may for example respond to four- (4) channels of DMX-512 protocol. For example, three channels may be dedicated to exemplary colors Red, Green, and Blue (RGB), and a fourth channel to activate a strobe feature.

Further, each feature (or function or mode of operation) may be configured as desired using attributes of the feature. Attributes (or parameters or properties) may be modulated based on predetermined values assigned to the attributes, defining a configuration. Non-limiting, non-exhaustive listing of examples of attributes may include, for example, a color of light that may be assigned a value to define the color of the light, an intensity of light, combinations of colors of lights, a strobe intensity and rate, and many others.

One or more embodiments of the present invention may use any number of protocols for communication with and control of programmable apparatuses, a non-limiting example of which may include the well-known DMX-512 protocol. For example, each attribute may be physically implemented (or associated) and mapped with one or more of the 512 DMX channels (if DMX-512 protocol is used) or, alternatively, mapped using other protocols to configure a programmable apparatus. Accordingly, the use of DMX-512 protocol throughout the disclosure should not be limiting and is meant to be illustrative, is for convenience of example, and is for discussion purposes only. In general, the present invention defines the term "protocol" in accordance with its plain and ordinary meaning, which is a set of rules governing the exchange and/or transmission of data between devices.

One or more embodiments of the present invention provide a method and a system for reconciling incompatibilities between programmable devices for connectivity, communication, and control (including exchange or transmission of data) between programmable devices without requiring hardware modifications (if any). More particularly, a method and a system is provided for communicating with and for controlling of programmable apparatuses using computing devices such as desktops, mobile computing devices, etc. that communicate with and control a programmable apparatus via a physical interface (such as a physical port) of the computing device. Non-limiting examples of control may include addressing, configuration, programming, and/or firmware modifications or changes of the programmable apparatus using an implemented graphic user interface (GUI) within the computing device.

One or more embodiments of the present invention provide system and method for direct communication with and for direct control of programmable apparatuses using computing devices such as desktops, mobile computing devices (e.g., mobile phones, etc.) that do not use or require a dedicated WI-FI™ router, a dedicated DMX-512 signal converter, and do not need or require an initial setup or configuration for exclusive communications between a computing device and a programmable apparatus.

One or more embodiments of the present invention provide system and method for direct communication with and for direct control of a programmable apparatus using a direct cable connection between a physical interface of a computing device and that of the programmable apparatus. The physical interfaces may be a physical port, non-limiting examples of which may include commonly available standard ports such as an audio port, a Universal Serial Bus (USB) port, XLR connectors, or others, including combinations thereof where for example, the computing device may have an audio port for example, and the programmable apparatus may have a USB or XLR connectivity.

FIG. 1 is a non-limiting, exemplary illustration of a system and a method for direct communication with and for direct control of an exemplary programmable apparatus using a computing device in accordance with an embodiment of the present invention. As illustrated in FIG. 1, computing device 102 (e.g., a mobile computing device such as a Smartphone) may be directly connected with programmable apparatus 104 (e.g., an intelligent micro-spotlight) using a physical wire (such as an audio plug cable 108) through commonly available standard physical interface port (such as an audio port 106) of computing device 102 for direct communication with and for direct control of programmable apparatus 104 with no additional hardware change despite the fact that computing device 102 and programmable apparatus 104 are incompatible in terms of their operating protocols. Once connected, one or more embodiments of the present invention reconcile incompatibilities between the connected devices and enable computing device 102 to control programmable apparatus 104 (e.g., change addressing, configuration, reprogram, and/or change firmware, etc.) using an implemented controller application (e.g., a DMX based application) 110 residing within the computing device 102.

As an example of incompatible protocols between device 102 and apparatus 104, it is well known that DMX-512 protocol (used by the intelligent micro-spotlight 104) enables communication at a baud rate of 250 Kbps while the most common highest bandwidth for audio communication (via the audio port 106 of the computing device 102) is at 44.1 KHz, which is significantly slower than the DMX-512 protocol. The reason for an upper limit of 44.1 KHz for signal transmission out of the audio port 106 is because the audio port 106 is designed and intended for human ears, therefore frequencies higher than 44.1 KHz are not useful. As yet another example of incompatibility, DMX-512 is digital signal based protocol, requiring DMX-512 digital signaling whereas audio port 106 of computing device 102 outputs analog audio signals. Accordingly, one or more embodiments of the present invention provide a system and a method that reconcile such incompatibilities between devices and enables communication and control between incompatible devices, which are detailed below. It should be noted that the details for the exemplary illustrated intelligent micro-spotlight 104 are fully disclosed in U.S. Patent Application Publication 2013/0221872, the entire disclosure of which is expressly incorporate by reference in its entirety herein. It should further be noted that where a definition or use of a term in the incorporated patent application publication is inconsistent or contrary to the definition of that term provided herein, the definition of that term provided herein applies and the definition of that term in the incorporated patent application publication does not apply.

Referring to FIG. 1, one or more embodiments of the present invention provide a system and a method for reconciliation for communication and control between incompatible devices, comprising a first device (e.g., computing device 102) that operates in accordance with a first protocol, a second device (e.g., programmable apparatus 104) that normally operates in accordance with a second protocol that is different from the first protocol, but commences operations in accordance with the first protocol upon establishment of a link between the first and the second devices (detailed below). The establishment of the link enables the first device to control and transmit non-transitory control signals to the second device in accordance with the first protocol. Additionally, the second device reverts to operating in accordance with the second protocol upon severing of the link between the first and second device, with non-transitory data of the second device modified by the non-transitory control signals of the first device.

Figure 2:
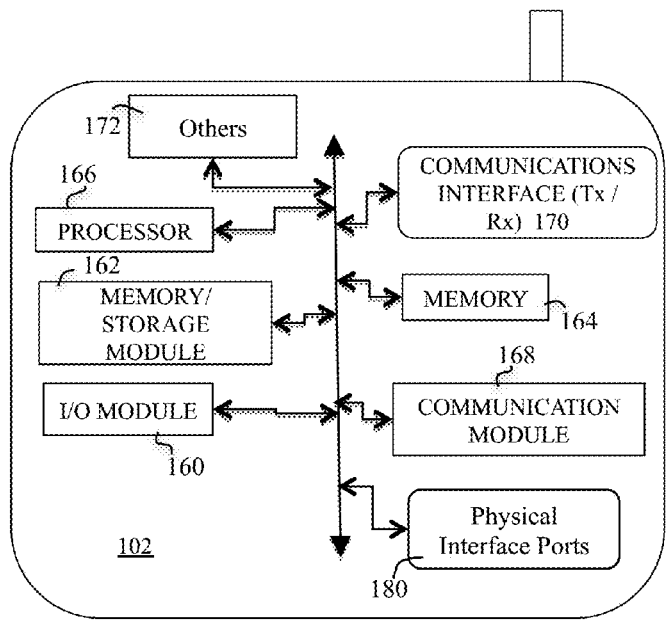
FIG. 2 is a non-limiting, schematic block diagram of an exemplary illustrated computing device shown in FIG. 1 in a form of a well-known and conventional mobile phone that may be used to implement one or more embodiments of the present invention.

One or more aspects of the present invention may be implemented on a conventional computing device 102. FIG. 2 is a non-limiting, schematic block diagram of an exemplary illustrated computing device shown in FIG. 1 in a form of a well-known and conventional mobile phone that may be used to implement one or more embodiments of the present invention. As illustrated in FIG. 2, the computing device 102 may be any well-known conventional computing device, non-limiting examples of which may include desktops, netbooks, notebooks, laptops, mobile devices such as mobile phones or computing tablets, or any other devices that may or may not be Network and or Internet enabled. The computing device 102 includes the typical, conventional components such as an I/O module 160 (e.g., a keyboard or touch screen display, etc.). The device 102 also includes a storage module 162 for storing information (that may use server based Cloud Computing Systems) and services, a memory 164 used by a processor 166 to execute programs, a communication module 168 for implementing desired communication protocol, a communications interface (e.g., transceiver module) 170 for wirelessly transmitting and receiving data, physical interface ports 180 (e.g., audio port 106, a USB port, etc.), and may or may not include other components 172 such as an image/video/sound capture device such as a camera, voice recording microphone, stylus, etc. It should be noted that a programmable apparatus 104 may be a computing device 102 and a computing device 102 may be a programmable apparatus 104 as both may be identical. It is only for clarity and discussion purposes that the present invention uses these two terms (e.g., "programmable apparatus" and "computing device") instead of using "first computing device 102/104" and "second computing device 102/104."

Figure 3A:
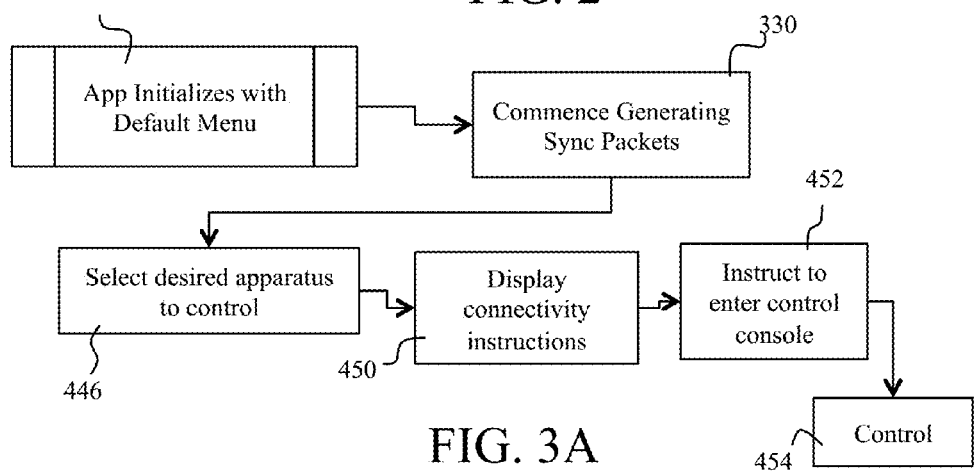
Figures 3, 3B:
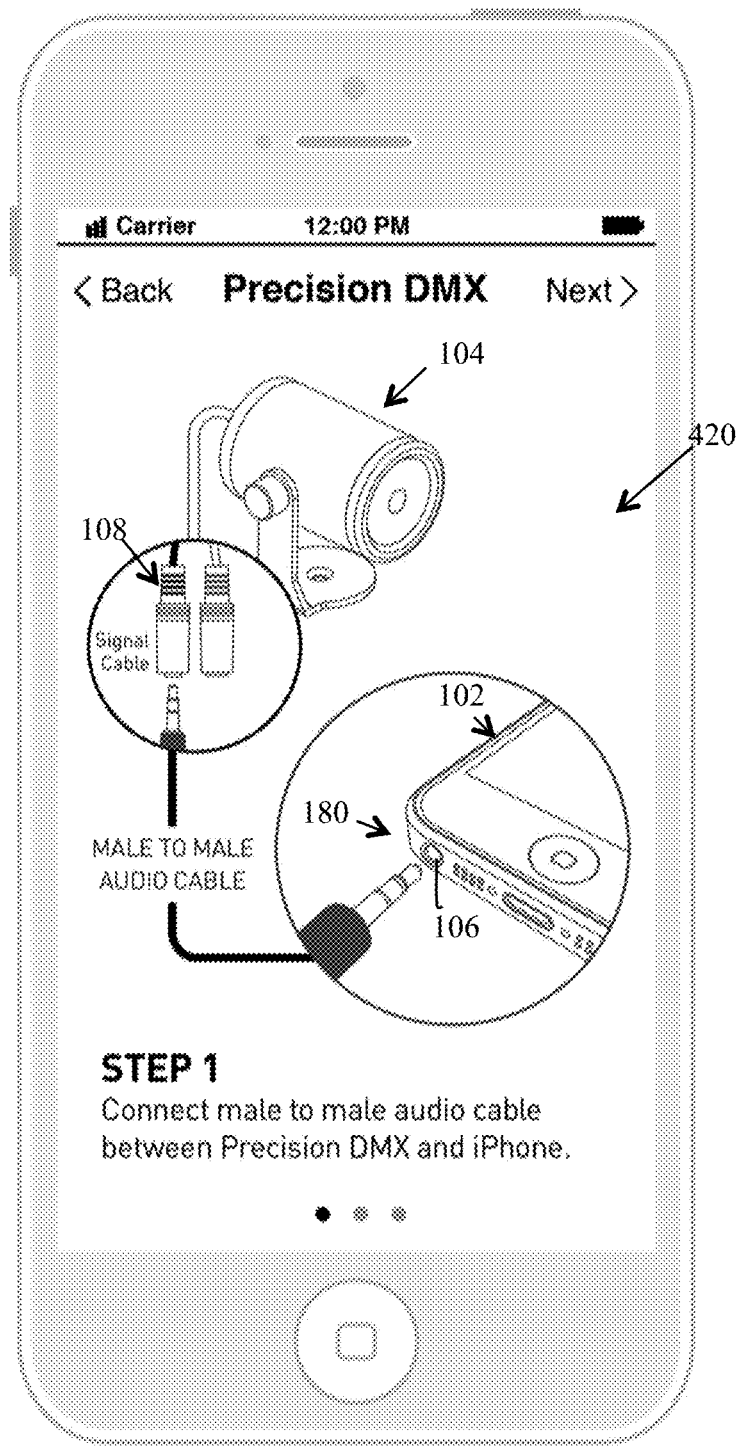
Figures 3, 3B, 4, 5:
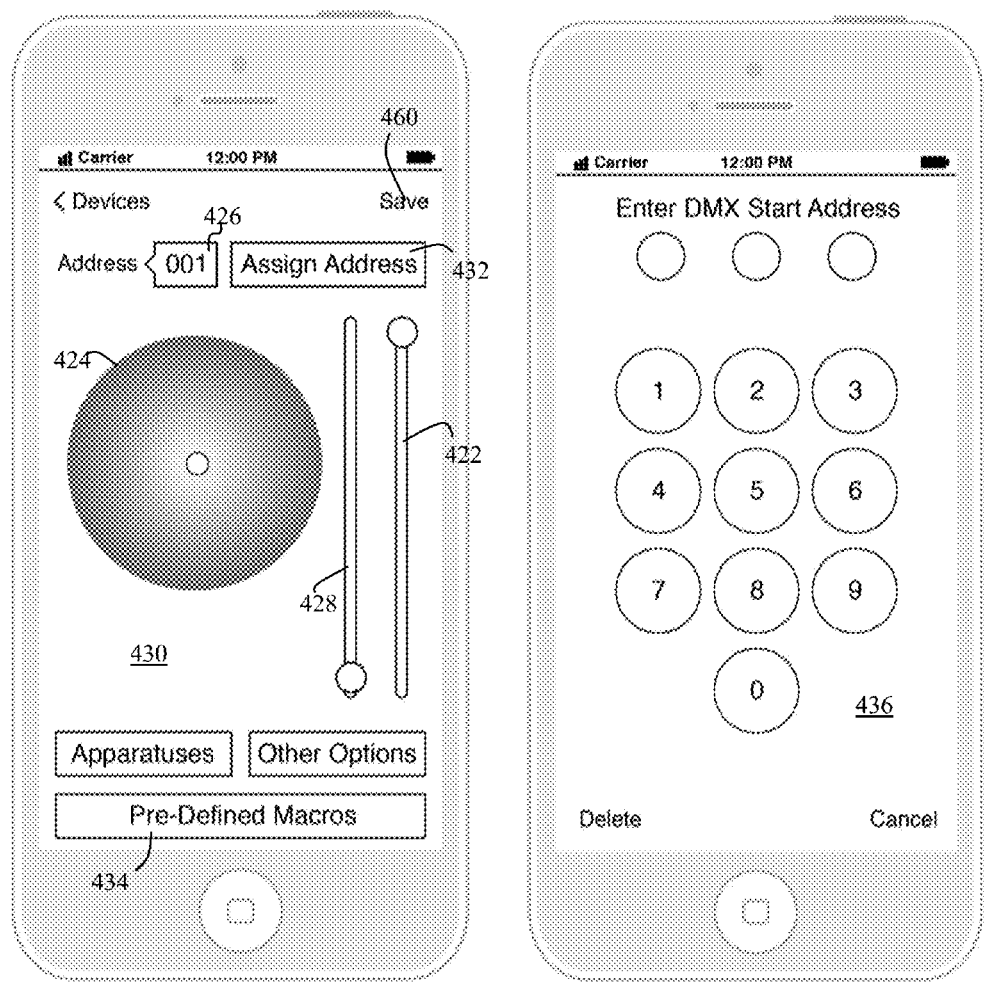
Figures 3, 3B, 4, 5, 6:
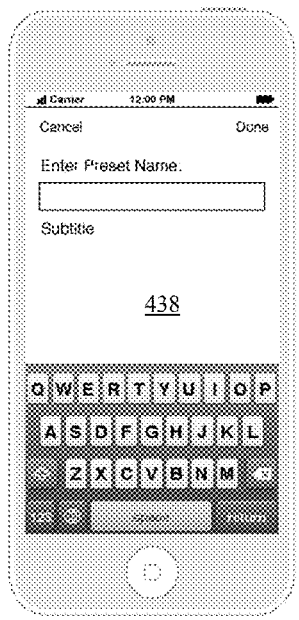
Figures 3, 3B, 4, 5, 6, 7:
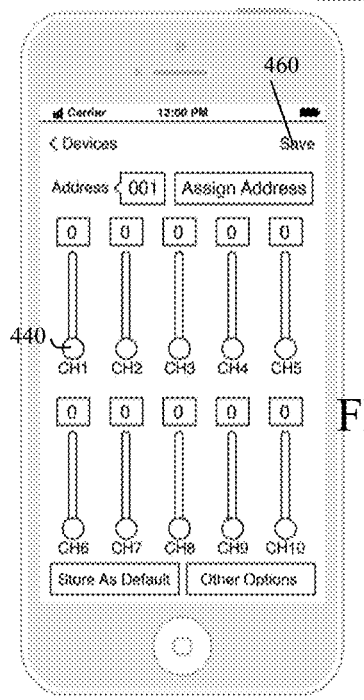
Figures 3, 3B, 4, 5, 6, 7, 8:
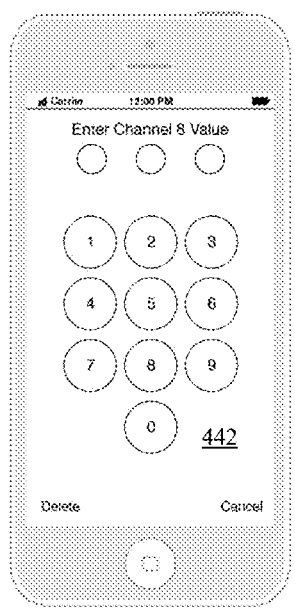

FIG. 3A to 3B-8 are non-limiting, exemplary illustration of a controller application for configuration-control of a programmable apparatus that illustrate screenshots that show an exemplary set of GUIs used for navigation and functionalities that may be implemented within the computing device for control (e.g., configuration) of a programmable apparatus.

FIG. 3A is a non-limiting, exemplary flowchart block diagram to illustrate the overall control (in terms of configuration-control) for a programmable apparatus using a computing device, with FIGS. 3B-1 to 3B-8 showing non-limiting, exemplary screenshots for a few functionalities related to configuration control. It should be noted that the handful of example screenshots and their respective functionalities illustrated are by no means exhaustive. Accordingly, only a few example screenshots are selected for discussion purposes. It should further be noted that the methods or processes for downloading and installation of the controller application 110 (e.g., the illustrated DMX-512 based controller application) may be done through well-known existing processes for various versions of the application such as mobile apps (if a mobile app version is used).

As illustrated in FIG. 3A, upon launching of controller application 110 (for configuration control) within computing device 102, controller application 110 initializes at operation 444 and displays default menu for configuration control via I/O module 160. After launch and initialization at operation 444, microprocessor unit 166 of computing device 102 commences generation of generic configuration sync packet (detailed below with respect to FIG. 4B-1) at operation 330. A benefit of generating a generic configuration sync packet prior to selection of a particular apparatus 104 is that it is possible that multiple profiles (detailed below) may be applied as control configuration to control different types of programmable apparatuses 104 without having to reboot and reconnect to generate specific configuration sync packet (at operation 448) for any particular apparatus 104.

Computing device 102 via controller application 110 at operation 446 displays a list of programmable apparatuses 104 to be controlled (configured), with the list including optional detailed information about each apparatus, compatibility, features, firmware, etc. Upon selection of the desired programmable apparatus 104 to be controlled (i.e., configured) at operation 446, controller application 110 displays a set of connectivity instructions for connecting programmable apparatus 104 to the computing device 102 at operation 450. After physically connecting programmable apparatus 104 and computing device 102, programmable apparatus 104 may optionally provide an acknowledgement of the connection. In general, it is very well known for most programmable apparatuses 104 (and or computing devices 102) to provide some type of indication of acknowledgement of a connection of an external device (for example, when an electronic device is connected to the USB port of a computer, the computer immediately acknowledges the connection and provides an indication for confirmation of whether the externally connected device is recognized). In a non-limiting, exemplary instance as described in FIG. 3A, if programmable apparatus 104 (as the intelligent micro-spotlight) successfully recognizes the generic configuration sync packet during programmable apparatus 104 initialization (detailed below), programmable apparatus 104 simply responds to any configuration control at operation 454, without any further requirement or need for "acknowledgement" of connection between devices.

As indicated above, FIGS. 3B-1 to 3B-8 are illustrations of a handful of non-limiting, exemplary screenshots that are related to configuration control. A non-limiting, exemplary illustration of a default menu (a main navigational GUI display screen 402) displayed at operation 444 for configuration control is illustrated in FIG. 3B-1. Main navigational GUI display screen 402 provides a central navigation to apparatus listing 406 of programmable apparatuses 104, including enabling a quick method to retrieve and view various saved profiles (or presets) 408 (FIG. 3B-2) for one or more programmable apparatus 104 by a mere selection of a profiles GUI icon 404 from the main navigational GUI display screen 402. Selection of profiles GUI icon 404 displays the saved profiles screen 412, which includes a profiles listing 416 of individually saved profiles 408 for one or more programmable apparatus 104. It should be noted that a single programmable apparatus 104 may include several profiles 408. For configurations profile 408, values defining the attributes for the configuration profile 408 may be set using controller application 110 as detailed below, with the profiles 408 simply defined as saved configurations for one or multiple apparatuses 414.

As with main navigational GUI display screen for configuration control 402, the saved profiles screen 412 includes an apparatuses GUI icon 410 that when selected, re-displays main navigational GUI display screen for configuration control 402. It should be noted that main navigational GUI display screen for configuration control 402 may include scrolling capability (up/down and/or left/right) to display more apparatuses 414 not shown in the viewable area of main navigational GUI display screen for configuration control 402. Therefore, the number of the displayed apparatuses 414 shown in FIG. 3B-1 is not limited to the five shown in the current viewing area of main navigational GUI display screen for configuration control 402. In fact, all screens for controller application 110 include all of the rudimentary navigational functionalities such as scrolling, or other well known features such as zooming in or out and so on that are well known and conventional.

Referring to FIG. 3B-1, upon selection of an apparatus GUI icon 414 (operation 446) to modify a selected programmable apparatus 104, controller application 110 at operation 450 displays a connectivity screen 420 (shown in FIG. 3B-3), which provides a set of instructions for users for physical connection of programmable apparatus 104 to be modified with computing device 102. As a reminder, simultaneously during this time, controller application 110 via computing device 102 continues generation of a sync packets at operation 330 (which is detailed below) transmitted through an appropriate physical interface port 180.

The instructions provided in connectivity screen 420 for physical connection of programmable apparatus 104 with computing device 102 may vary depending on programmable apparatus 104 and the type of connectivity used (e.g., audio, USB, XLR etc.). In the non-limiting, exemplary instance illustrated in FIGS. 1 and 3B-3, the connectivity used is audio port 106 of computing device 102 and programmable apparatus 104 is the intelligent micro-spotlight, with the instruction set directing users to first couple data signal cable 108 to programmable apparatus 104 and computing device 102 and next, plug in power cable 112 of intelligent micro-spotlight 104 to an appropriate power supply source. In general, the signal cable 108 between the programmable apparatus and the computing device is connected first, before applying power to the programmable apparatus, which ensures that when the programmable apparatus is boot up, it will immediately receive the appropriate sync packet (detailed below). It should be noted that the sequence of connection specified where data signal cable 108 is connected first and power cable 112 connected second is specific to devices that are incompatible in terms of rate of transmission or exchange of data or transmission speed (amount of data per unit of time) at which they communicate (or transmit or exchange data). Accordingly and as detailed below, synchronization of transmission rate of data is assured when connecting the data signal cable 108 first before the programmable apparatus 104 is turned ON. However, if rate of transmission of data is compatible for both devices, the above specified sequence of connection would not be of factor. In other words, assuming two devices that communicate at the same rate of transmission, data signal cable 108 and power cable 112 may be connected at any sequence.

As further illustrated, in this non-limiting, exemplary instance, physical interface port 180 is exemplarily illustrated as a standard audio port 106 of computing device 102, which requires that data signal cable 108 to have standard audio plugs (rather than, for example, USB or XLR, or others). In this non-limiting, exemplary instance for example, data signal cable 108 used is a male-to-male $\frac{1}{8}^{th}$ inch "mini-jack," (also known as 3.5 mm Tip Ring Sleeve—TRS for short) which plugs between intelligent micro-spotlight 104 and audio port 106 of computing device 102.

The remaining FIGS. 3B-4 to 3B-8 are non-limiting, exemplary illustrations of a few, handful of specific examples of screenshots that show various sets of GUIs used specifically for configuration control of the intelligent micro-spotlight connected to the computing device 102. As indicated above, the illustrated screenshots, GUI icons, and their respective operations and functionalities shown are by no means exhaustive and may be varied and are completely device dependent. For example, the GUI icon 422 represented as a GUI sliding bar in FIG. 3B-4 (detailed further below) may be used to control (e.g., configure) the level of intensity of a particularly selected color of light for the connected intelligent micro-spotlight 104. However, if instead of the intelligent micro-spotlight a programmable fog machine is used as the programmable apparatus 104, the same GUI sliding bar 422 may be used to control (e.g., configure) the amount or duration of release of material from the programmable fog machine to create a desired fog affect. Accordingly, depending on the type of apparatus GUI icon 414 selected, a corresponding set of GUIs specific for configuration control of the selected programmable apparatus 104 will be displayed by the controller application 110. Therefore, screenshots and GUI icons are contextual, depending on the specific type of programmable apparatus to be configured.

As illustrated in FIG. 3B-4, by selection of the GUI icon 414 for the selected programmable "Apparatus 1" in FIG. 3A-2, which in this particular non-limiting, exemplary instance corresponds to the connected programmable apparatus 104 (the intelligent micro-spotlight), a commensurate user interface (first configuration control screen 430) is displayed with color wheel, scrollbars, address selectors, and so on, all of which are specifically designed to fully and completely configure intelligent micro-spotlight 104 in accordance with the firmware setting of intelligent micro-spotlight 104. Manipulations of any one of the illustrated GUI icons in well known conventional manner (e.g., via touch screen) is received as input (e.g., gesture input) by computing device 102 and translated to control signals that are eventually transmitted via the connected physical interface to control the physically connected intelligent micro-spotlight 104. More specifically, first control screen 430 for intelligent micro-spotlight 104 may for example, include a GUI icon 422 represented as a GUI sliding bar for setting light intensity for example, another non-limiting, exemplary GUI icon 428 also as a GUI sliding bar for setting speed (for example, strobe rate of the light), and finally a GUI icon 424 represented as a color wheel for selecting a color of the light, including conventional Save GUI icon 460 to save set values for the attributes.

Further included is GUI icon 426 for setting addresses which when selected displays a number entry screen GUI 436 (FIG. 3B-5), which is a well known and readily recognized number entry display that is used to enter data (in this instance, a DMX based addressing scheme) for the intelligent micro-spotlight fixture 104. After entry of the address, which is displayed in the GUI display 426 (FIG. 3B-4), controller application 110 enables the actual assignment of the selected address to the intelligent micro-spotlight 104 when the Assign Address GUI icon 432 is selected (or tapped). This way, the DMX start address for the connected fixture is saved. Upon selection of the Save GUI icon 460 after all the settings, controller application 110 displays a typical save screen 438 (FIG. 3B-6) for saving the configuration as a saved profile 408.

As with most applications, the one or more embodiments of controller application 110 of the present invention provide different methods of accomplishing the same or similar tasks. For example, controller application 110 may provide an "expert mode" GUI setting where upon selection, toggles the display screen to expert mode (FIGS. 3B-7 and 3B-8) for selection of individual raw channels (DMX-512 channels) 440, which can be tuned by selecting the desired GUI channel (e.g., channel 8 "CH8"), which would then display a number entry screen 442 (FIG. 3B-8) to edit set values for that channel. As further illustrated in FIG. 3B-4, one or more embodiments of the present invention may also provide pre-defined macros, which are simply presets (or pre-defined profiles). Selection of pre-defined Macro GUI icon 434 displays a set of previously defined macros for users. By selecting one of the macros, preset values are loaded into the DMX output and sent to the programmable apparatus.

It should be reemphasized that the illustrated screenshots and GUI icons are non-limiting, exemplary illustrations of only a few, handful of specific examples of screenshots and GUI icons used for a few, handful of operations and functions for only a single apparatus (e.g., the intelligent micro-spotlight 104) for convenience of example and discussion purposes, and are by no means exhaustive and should not be limiting.

Figures 1, 2, 4A, 4B:
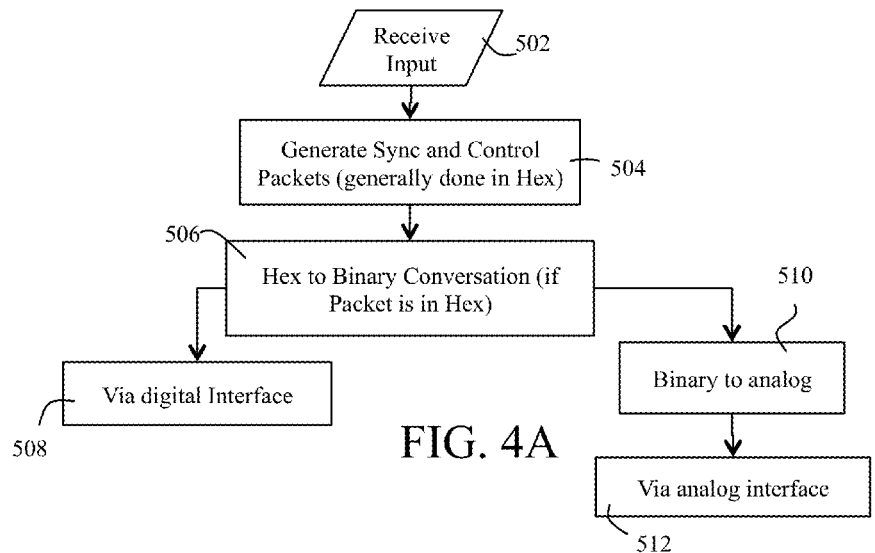

FIG. 4A is a non-limiting, exemplary flowchart for input and eventual transmission of sync and control packets by the controller application in accordance with one or more embodiments of the present invention. As indicated above, manipulations of any one of the illustrated GUI icons in well known conventional manner (e.g., via touch screen) is received as input (e.g., gesture input) 502 by the controller application 110 of the computing device 102 and translated to control signals that are eventually transmitted via the connected physical interface 180 to control the physically connected programmable apparatus 104. More specifically, any GUI input (e.g., modulation of sliders, color wheels, or actuation of upload a firmware control, etc.) received at operation 502 is converted to a byte stream at operation 504 to be transmitted, with each byte converted to its binary bits at operation 506 to generate a binary stream. (As detailed below, it should be noted that for firmware control, a newly downloaded firmware is already fully compiled into binary and hence, there is no requirement or need for any conversion.)

The controller application 110 converts the input gestures received at operation 502 into desired protocol packets (in this exemplary instance, DMX based packets, which are sequences of bytes). In other words, users' gestures are input via a touch screen that manipulate GUIs, with the user gestures interpreted by controller application 110 of computing device 102 in well known manner, and converted or mapped to desired protocol packets (e.g., DMX packets). The generated DMX packets (which are generally expressed in hexadecimal values) are then converted to binary bits at operation 506.

As indicated above, computing device 102 may include a single or multiple physical interface ports 180 that may be analog or digital based interfaces, non-limiting examples of which may include the illustrated audio port 106 that is analog based, a USB port that is digital based, or other types of ports such as XLR. Accordingly, after controller application 110 generates the data packets (formatted unit of digital data) at operation 504 in hex-bytes (control and sync packets) and converts the packets to binary bits at operation 506, next, depending on the type of physical interface port 180 used, the packets (control or synch) are either directly transmitted via a digital interface (e.g., a USB port) at operation 508 or converted to analog signal at operation 510 for transmission via an analog interface (e.g., the audio signal port 106) at operation 512.

FIGS. 4B-1 and 4B-2 are non-limiting, exemplary illustrations of different types of data packets used in accordance with one or more embodiments of the present invention. FIG. 4B-1 is non-limiting example of a generic configuration sync packet in accordance with one or more embodiments of the present invention wherein controller application 110 only includes configuration control without the ability for firmware control. As indicated above, generic configuration sync packets may be generated upon launching of controller application 110 and are formatted to include a header that has a specific sequence of bytes that identifies the packet as a sync packet, a payload that has specific sequence of bytes that identifies a type of the distinct sync packet (e.g., a configuration, addressing, etc.), and a trailer that contains error checking data such as the well known checksum error checking scheme. In general, the generic configuration sync packets may preferably be generated for configuration control only as they intentionally lack the programmable device ID for an easier control of programmable apparatuses 104 as detailed in relation to FIG. 3A-2.

FIGS. 4B-2 is non-limiting example of a generic control packet in accordance with one or more embodiments of the present invention wherein controller application 110 only includes configuration control without the ability for firmware control. As indicated above, generic control packets are generated as a result of input received by the controller application 110. The control packets are formatted to include a header that identifies the packet as a control packet, a payload that includes control data (actual data for configuration and or firmware control), and a trailer that contains error-checking data such as the well-known checksum error-checking scheme.

In general, a sync packet (all variations) identifies the type of control data packet (firmware change, control configurations, etc.) to be expected and received by the programmable apparatus 104 in addition to identifying to a CPU 302 (FIGS. 6A and 6B) of the programmable apparatus 104 that the sync packet itself is an actual true sync packet so that the CPU 302 will maintain the appropriate operational protocol (e.g., operational frequency at desired rate) with the connected computing device 102. For example and as detailed below with respect to firmware control, the sync packet for firmware control instructs the programmable apparatus 104 that the next incoming control packet is a firmware update (a programming code) that is generally written into the non-volatile memory of the CPU 302. A simple modification in byte sequence within the payload of the sync packet may be used to instruct the CPU 302 of the programmable apparatus that the next control packet is a configuration control packet rather than for example, a firmware change control packet. Accordingly, a sync packet is generated and transmitted by computing device 102, which instructs CPU 302 of programmable apparatus to change and maintain the appropriate operational protocol (e.g., operational frequency at desired rate) with the connected computing device 102.

It should be noted that the sync packets and the control packets may follow any protocol and need not be "cast" or mapped to a DMX-512 protocol, and are preferably transmitted serially. Controller application 110 generates and transmits control packets (e.g., configuration control, firmware control, or others) along with sync packets when input is received (operation 502) by the controller application 110. In general, one or more control data packets and one or more sync packets are transmitted serially as a stream of packets, with at least one sync packet transmitted within a predetermined time interval (detailed below) to maintain the programmable apparatus 104 in a desired operational protocol (e.g., the first frequency of operation). Of course, the control packets may also be transmitted serially and sync packets transmitted serially, with both transmitted in parallel as individual serial streams of packets (which may be physically accomplished by using two wires).

As indicated above, after the controller application 110 generates the packets at operation 504 in hex-bytes (control and sync packets) and converts the packets to binary bits at operation 506, next, depending on the type of physical interface port 180 used, the packets (control or synch) are either directly transmitted via a digital interface (e.g., a USB port) at operation 508 or converted to analog signal at operation 510 for transmission via an analog interface (e.g., the audio signal port 106) at operation 512. Continuing with the non-limiting example illustrated in FIG. 1 where an audio port 106 is used to transmit control signals, the digital control and sync signals (mapped to a DMX protocol) are converted to an analog signal at operation 510 and transmitted via the analogue audio port 106.

The conversion of the binary control and sync signals (the packets) into analog control and sync signals is readily accomplished in well known and conventional manner by existing hardware such as an audio codec and processor 166 of the computing device 102 that includes a Digital to Analog (D/A) and Analog to Digital (A/D) converter. The conversion is similar to conversion of stored digital music within a computing device 102 and output thereof via an audio port 106, which is in analog format as an analog audio signal. In other words, the DMX based digital control and sync signals are converted to respective analog signals and output via the audio port 106, but output at a lower frequency, generally lower than 44.1 KHz. It should be noted that in general, 44.1 KHz is the general sampling rate of the audio codec and hence, the frequency (rate of data provided to it) generated by controller application 110 is less than half 44.1 KHz (or approximately 20.5 KHz). In practice however, using a sample rate of 38.4 KHz (which is less than 44.1 KHz) to generate a 9600 baud signal (4 samples per bit) is a preferred transmission speed because 9600 baud is a common serial transmission speed and having more than 2 samples per bit improves the fidelity of the signal shape. Specifically, increasing the number of samples per bit reduces signal overshoot and resonant ringing on the Digital to Analog converter output of the audio codec. One can certainly increase the samples per bit even further at the cost of slower transmission speeds, for example a 38.4 KHz sampling rate with 16 samples per bit would generate more precise signals but can only transmit at 2400 baud. It should further be noted that a conventional audio codec of a computing device 102 includes an Application Programming Interface (API) with various attributes (e.g., number of bits being coded and the sampling rate), the values of which may be changed in well-known and conventional manner by controller application 110 to output analog signals at a desired frequency. In particular, the API of the audio codec enables selection of a particular voltage level of an audio signal to be output via the audio port.

Since signals (packet or sync) from controller application 110 are all digital, for single ended signaling transmission (detailed below), for every digital "0," the audio-codec instructed by processor 166 outputs a maximum negative voltage (−Vmax) and for every digital "1," outputs a maximum positive voltage (+Vmax). The actual conversation of the digital signals (sync and or packet) is accomplished by the D/A converter of processor 166 of computing device 102, which instructs the codec to output maximum negative or positive voltages. As detailed below, for differential signaling transmission, for every digital "0," the audio-codec instructed by processor 166 outputs a first maximum negative voltage (−Vmax1) and a differential thereof, which is a first maximum positive voltage (+Vmax1), and for every digital "1," outputs a second maximum positive voltage (+Vmax2) and a differential thereof, which is a second maximum negative voltage (−Vmax2).

It should be noted that in order for audio-codec to be able to generate maximum voltages instructed by the processor 166 and actually output the maximum voltage (positive or negative), audio volume of computing device 102 must be set to maximum level to ensure signal integrity. If the audio volume of computing device 102 is low (not set to maximum highest level), resulting analog voltage level (or strength) may not be sufficient to be detected by programmable apparatus 104. Accordingly, during operation 450, users may be provided with instruction to set the volume level of computing device 102 to maximum, highest level. As detailed below and best illustrated in FIG. 4C-1, analog signal output 514b from audio-codec within about 50 msec to about 200 msec is the maximum positive voltage (+Vmax), which is a representation of digital signal received from controller application 110.

Figures 1, 4C:
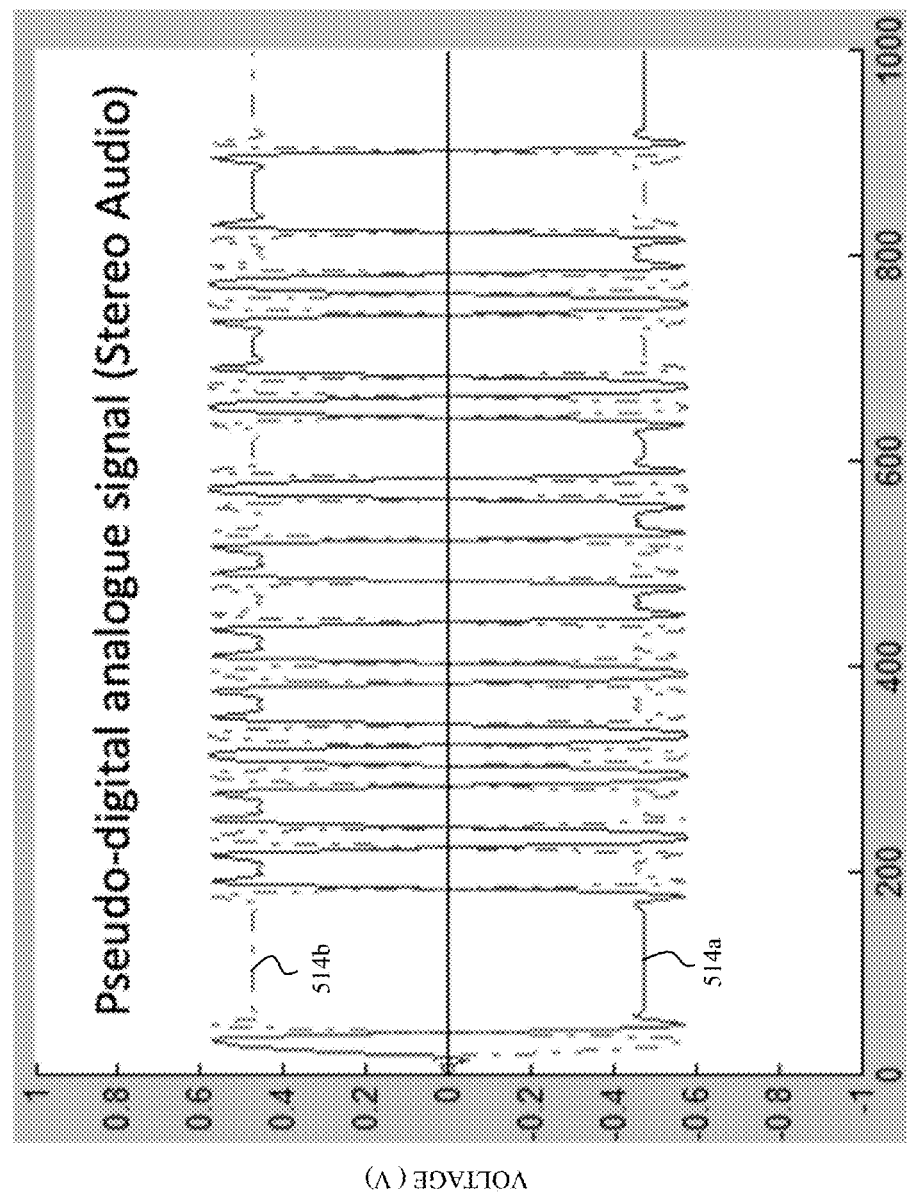
Figures 2, 4C:
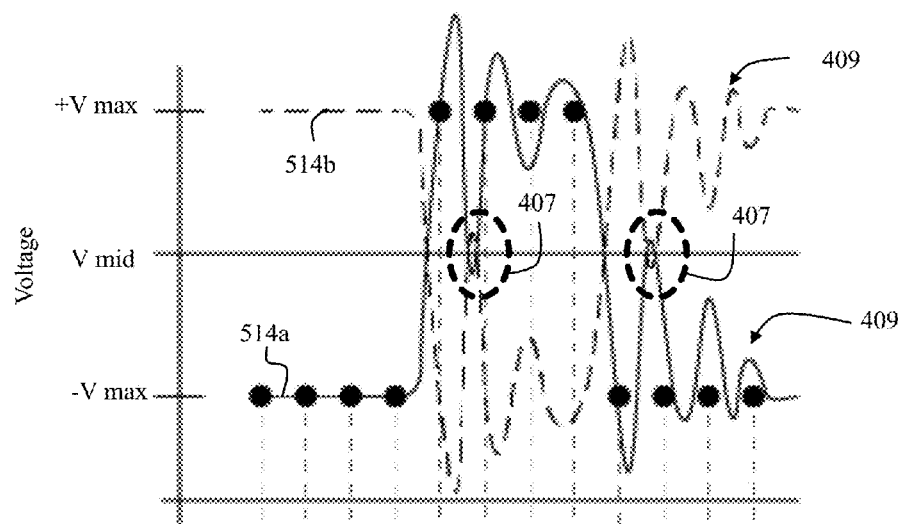
Figures 3, 4C:
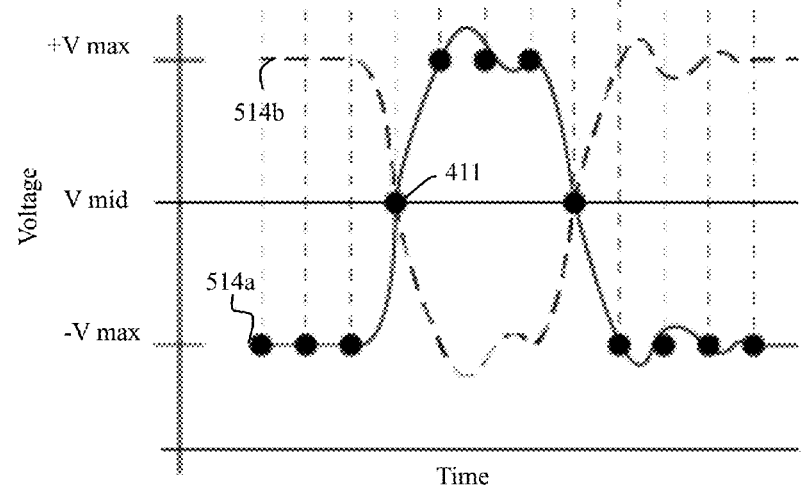

FIG. 4C-1 is a non-limiting example of a analog signal (in a pseudo-digital form) of a converted stream of digital packets (control and or sync) using any number of well known pre-existing hardware as part of the audio port interface of a computing device, which may include an audio codec. As illustrated, the high and low logic levels of the analog signal mask the analog signal (i.e., analog nature) of the audio signal and cast it as "digital-like" analog signal and hence, generating a pseudo-digital, but analog signal that contains DMX signaling information. As illustrated, analog signal 514*a* is a non-limiting example of an analog version of a digital control and or sync packets output at audio port 106 of computing device 102, where a digital zero (0) of a packet is converted to an analog negative voltage level and a digital one (1) of the packet is converted to an analog positive voltage level in accordance with predefined attributes of the API of the audio codec, the values for which are set by the controller application 110. (It should be noted that for differential signaling transmission (detailed below), signal 514*b* may be the differential of signal 514*a* or vice versa).

Figure 5A:
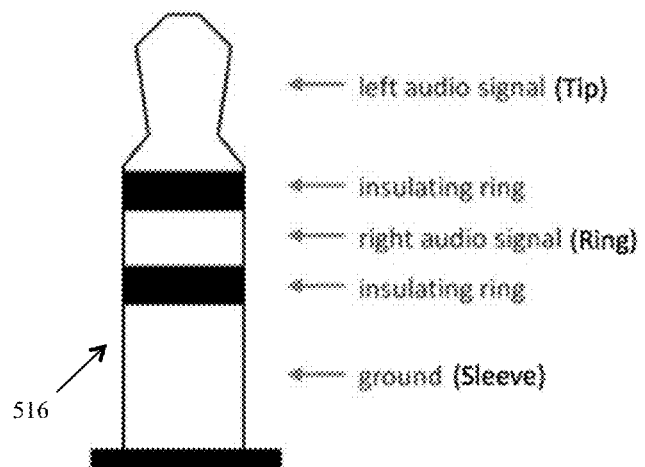
FIGS. 5A to 5F are non-limiting, exemplary illustrations of hardware and associated signaling schemes in accordance with one or more embodiments of the present invention.
Figure 5B:
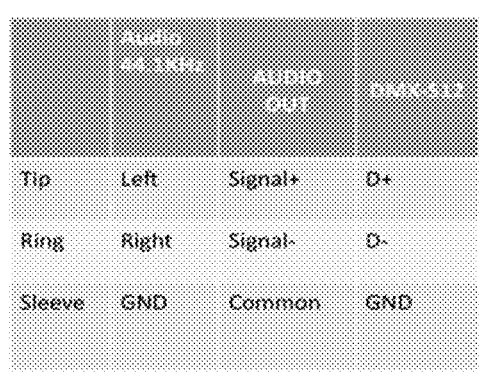
Figures 1, 5C:
Figures 2, 3, 5C:
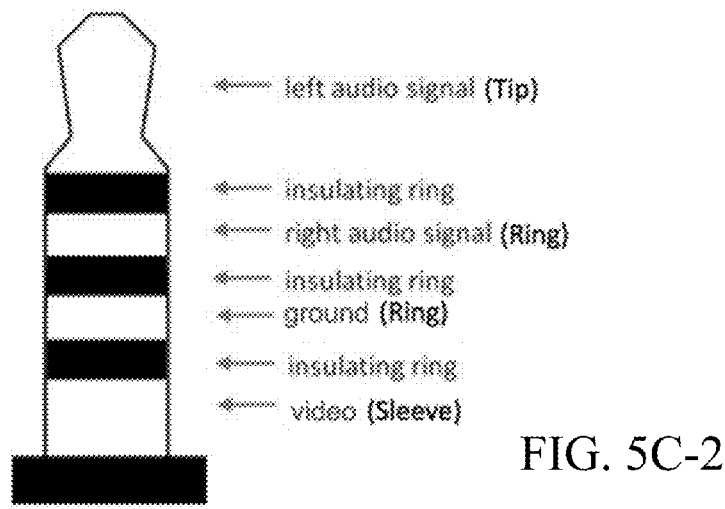

As is detailed below in relation to FIGS. 5A to 5F, the analog signal 514*a* may be transmitted using differential, single ended, multi-differential, or multi-single ended signaling transmission because most physical interface ports (e.g., a typical audio port or a typical USB port) have the actual hardware to enable these types of transmissions. As illustrated in FIG. 5A, a typical audio jack has a tip, ring, sleeve configuration, which as illustrated in the table of FIG. 5B, may for example, be mapped to an RS-485 implementation of a DMX protocol values of D+, D−, and GND for differential signaling transmission. On the other hand, FIG. 5C-1 is another example of a mapping table for an audio jack output to transmit serial data as a single-ended transmission. As yet another example, other audio jacks may comprise of a tip, multiple rings, and sleeve configurations that may, for example, be mapped to other permutations of serial transmission for single-ended/differential transmission. Further, as illustrated in FIGS. 5C-2 and 5C-3, multi-single ended and or multi-differential transmission may also be used to control multiple apparatuses simultaneously using a single computing device 102 by transmitting several serial signals S1, S2, S3, Sn using other well known audio jacks with multiple ring configuration (FIG. 5C-2). It should be noted that the tip, ring, sleeve mapping to various signaling may be varied, for example, tip may be mapped to right or signal− (or D−) and ring to left (or D+) or some other combinations or permutations.

Figures 5D, 5E, 5F:
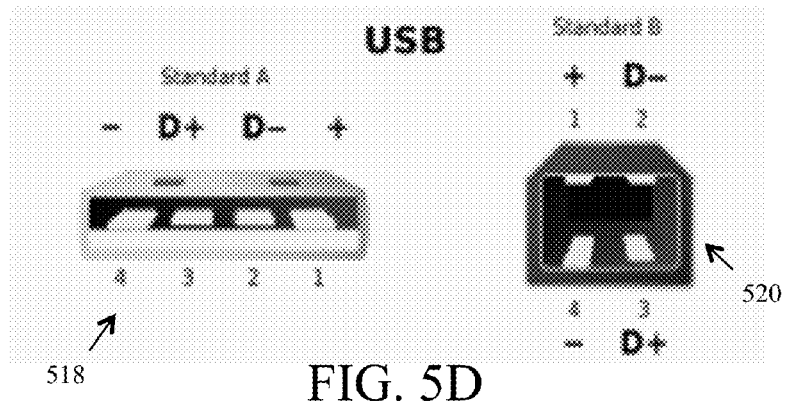

FIG. 5D illustrates two conventional USB jacks 518 and 520 with a set of pins, which as illustrated in the table of FIG. 5E, may also be mapped to an RS-485 implementation of DMX protocol values of D+, D−, and GND for differential signaling transmission using USB. On the other hand, FIG. 5F is a mapping table for USB that maps USB ports to an RS-458 implementation of DMX protocol values of D+, D−, and GND for single-ended transmission. As with an audio jack, various permutations of mapping USB or XLR connection to various signaling is possible for example, Pin 2 (or Data− or Signal−) of USB may be mapped to D+ of DMX-512 instead of the illustrated (D−).

Accordingly, whether using an audio port 106 with its D+/D− or USB port with its D+/D−, both differential and single-ended transmissions are possible. For single ended transmission scheme, the D− may be set to GND by controller application 110, which means the D− terminal may be at a constant voltage GND, whereas D+ terminal varied in voltage output.

Referring back to FIG. 4C-1, for single-ended signaling via the audio port, in the exemplary instance illustrated, only the analog signal 514*a* is output via the Tip of the audio jack, with the Ring set to GND by controller application 110. For USB for example, actual digital signals may be output via pin 3 while the pin 2 may be set to GND, for example. However, for differential signaling via audio port 106, analog signal 514*a* may for example, be output via the Tip, and its differential (complementary signal) 514*b* via the Ring with the sleeve connected to GND. For differential signaling via the USB, the digital signals may be output via the pin 3, the differentials via the pin 2 with pin 4 connected to GND. Accordingly, with differential signaling, analog signals 514*a* and its differential 514*b* are generated and transmitted as illustrated in FIG. 4C-1, with differential voltages carried over cable 108 to connected programmable apparatus 104 whereas with single ended signaling, only analog signal 514*a* is generated and transmitted, with D− transmitting a GND signal. It should be noted that the physical interface port of the computing device may be an audio port or other type of port (e.g., USB, XLR, etc.) whereas that of the programming apparatus may be a USB port and or other type such as, for example an XLR connection. Accordingly, the ports of the first and the second devices need not be the same and may be different.

For analog pseudo digital signals (such as those shown in FIG. 4C-1), signal integrity (signal decay, data corruption (due to signal crossings 407), ringing 409 etc. shown in FIG. 4C-2) is an issue with respect to certain computing devices 102 and more specifically, for differential signaling. Accordingly, (as best illustrated in FIG. 4C-3) to maintain the integrity of sync or control packet signals transmitted from device 102 to apparatus 104 (as singles 514*a* and 514*b*), application controller 110 may transmit (or drive) the signals to some set intermediate voltage value Vint at the transition point when the signals rise or fall between +Vmax/−Vmax. This scheme prevents data corruption for differential signals due to potential signal overshoot (causing signal crossing) or "ringing." That is, by driving the signal 514*a*/514*b* to an intermediate value Vint, the application controller 110 generates a smoother signal at a lower bandwidth transition between +Vmax and −Vmax (best shown in FIG. 4C-1). Stated otherwise, the scheme reduces or impedes the "sudden" transition between +Vmax and −Vmax. It should be noted that Vint is a replacement of one or more samples 411 (mentioned above with respect to the 4 samples per bit), which would have been either +Vmax or −Vmax. As indicated above, 4 samples per bit is only a non-limiting, exemplary sampling rate.

Figure 6A:
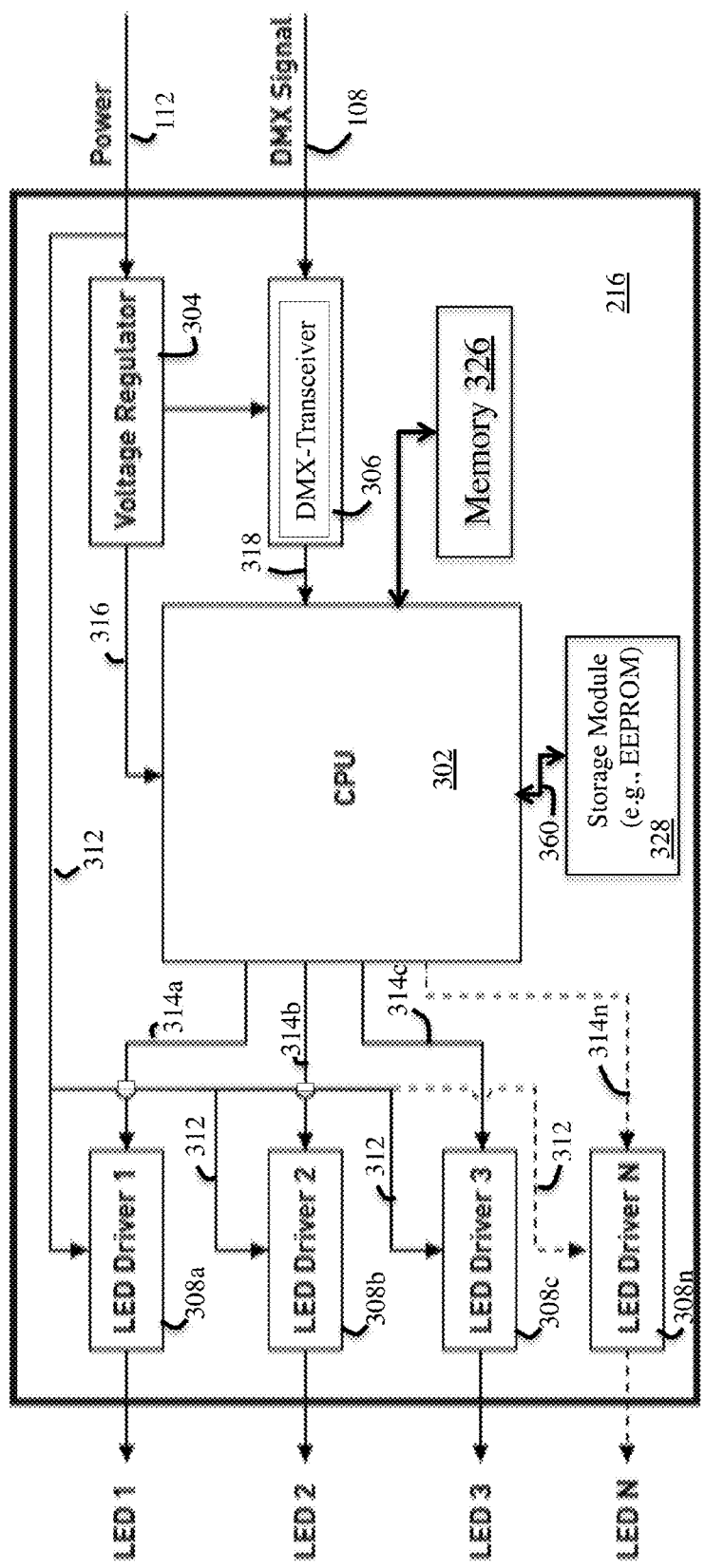
FIGS. 6A and 6B are non-limiting, exemplary block-diagram illustrations that detail a circuit topography of an intelligent micro-spotlight (to be used as an example of a programmable apparatus) in accordance with one or more embodiment of the present invention.
Figure 6B:
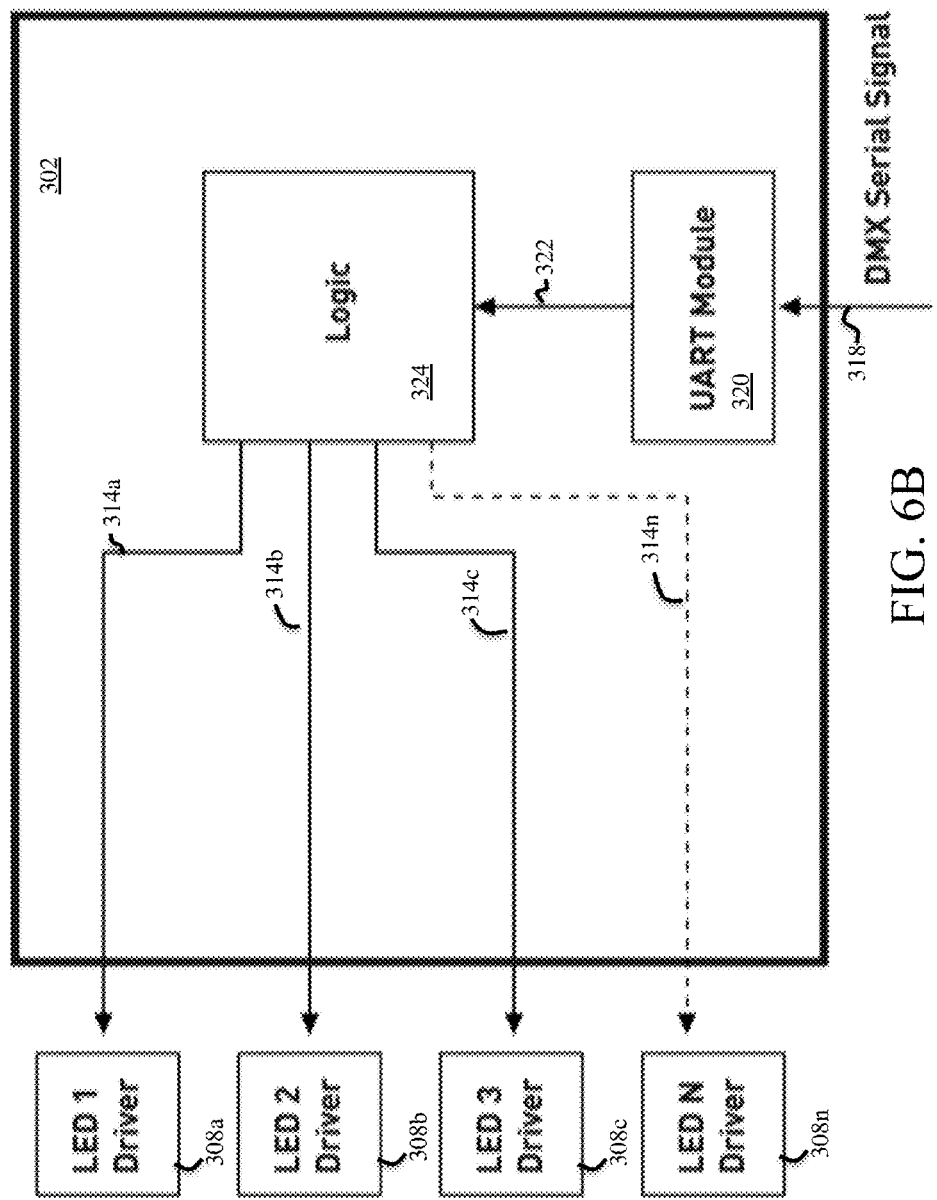

FIGS. 6A and 6B are non-limiting, exemplary block-diagram illustrations that detail a circuit topography of an intelligent micro-spotlight (to be used as an example of a programmable apparatus) in accordance with an embodiment of the present invention. As illustrated in FIGS. 6A and 6B, control circuit 216 of intelligent micro-spotlight 104 is comprised of Central Processing Unit (CPU) 302 for processing of power and control signals (sync and or control packets). Control circuit 216 further includes storage module 328 and memory 326, which may comprise a Read Only, Random Access, Volatile, and or Non-Volatile memory for storage of applications and instructions. A voltage regulator 304 of control circuit 216 receives power from power cable 112 and provides regulated voltage (step-down voltage) 316 to CPU 302.

Further included in control circuit 216 is a signal receiver 306 (e.g., a DMX receiver) that receives control signal from signal cable 108 and provides logic level signal 318 to CPU 302. It should be noted that signals on signal cable 108 are typically higher voltage and using multiple (differential) lines (D+ and D−) such as using the RS485 standard to overcome transmission noise whereas signal 318 are single logic level signals. DMX receiver 306 does a conversion of signal format and shifts the voltage. Signal receiver 306 (exemplarily illustrated as a differential amplifier 301 in FIG. 6C) and its functionality are well known, and may generally be compatible with most control protocol used and need not be limited to DMX. It should be noted that signal cable 108 is illustrated in FIG. 6A for completeness and discussion in view of programming intelligent micro-spotlight 104 (detailed below), but would not be required when intelligent micro-spotlight 104 is already programmed and in use in standalone operation. Control circuit 216 also includes one or more light source driver modules 308 that receive power (PCB power lines 312) from power cable 112 and processed signals (PCB signal lines 314) from CPU 302 to power and operate (modulate) one or more light sources 206.

As best illustrated in FIG. 6B, CPU 302 is comprised of a well-known Universal Asynchronous Receiver Transmitter (UART) module 320 for receiving programming control signal 318, and a Logic Unit 324 for decoding received serial signal 322 from UART module 320 and for outputting one or more processed signals 314 for operation of one or more light sources 206. It should be noted that similar communication is possible where the received programming control signal 318 is connected to another input port of the CPU 302, bypassing UART module 320. At minimum, received programming control signal 318 must be processed and hence, it may be accomplished without input to UART module 320, such as being connected to a general input/output port of the CPU.

Figure 6C:
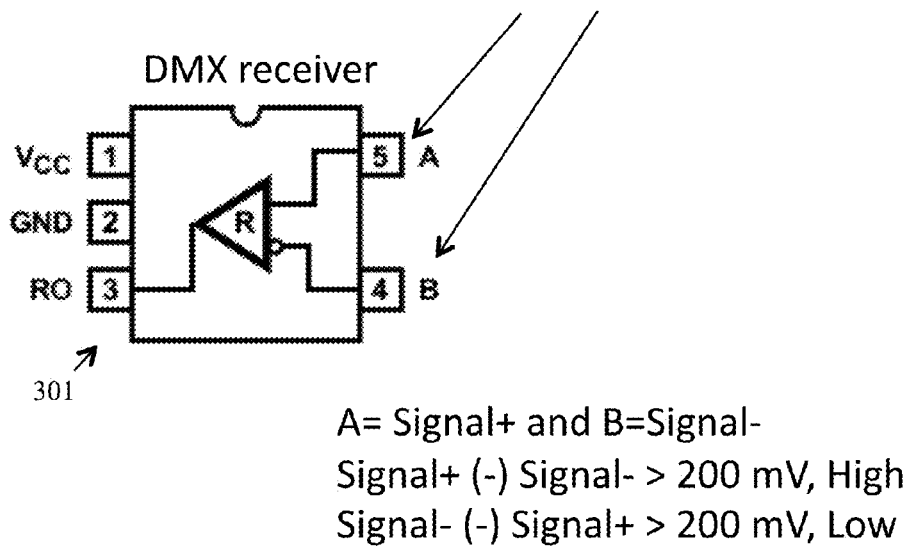
FIG. 6C is a non-limiting, exemplary illustration of a signal receiver in accordance with one or more embodiments of the present invention.

As indicated, if in standalone operation, control signals 360 would be retrieved and read by CPU 302 from storage modules 328 as preprogrammed, stored data, and if used in a non-standalone operation (where intelligent micro-spotlight 102 is being programmed or controlled, which is detailed below), programming control signal 318 would be used. Referring to FIG. 6C, assuming differential signaling is output via audio port 106, then the generated differential signals 514a and 514b are received at terminals A and B of the differential amplifier 301 of the DMX receiver 306, and processed in accordance with the signals shown in FIGS. 6D and 6E.

Figure 6D:
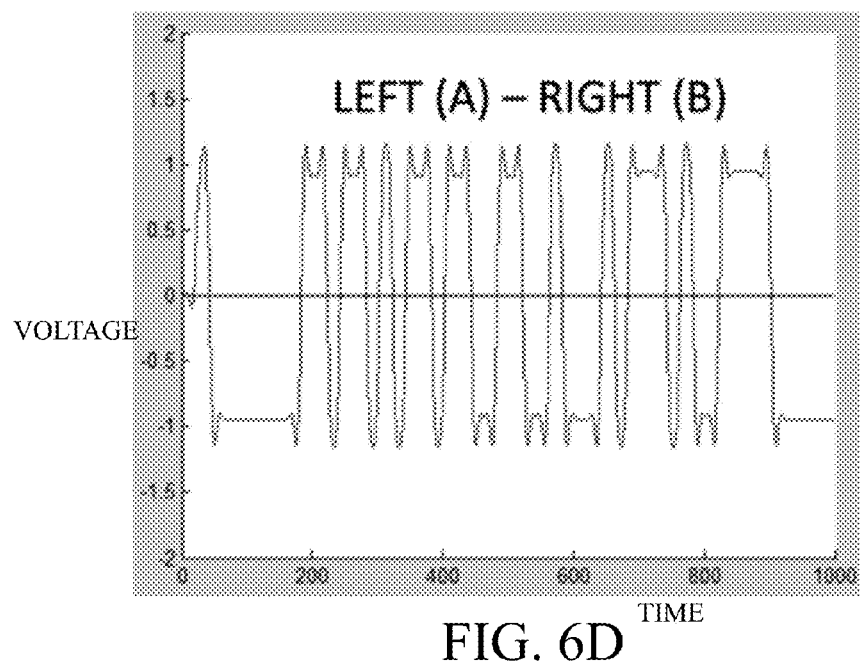
FIG. 6D is a non-limiting, exemplary illustration of processing of analog pseudo-digital signal by the signal receiver of FIG. 6C in accordance with one or more embodiments of the present invention.
Figure 6E:
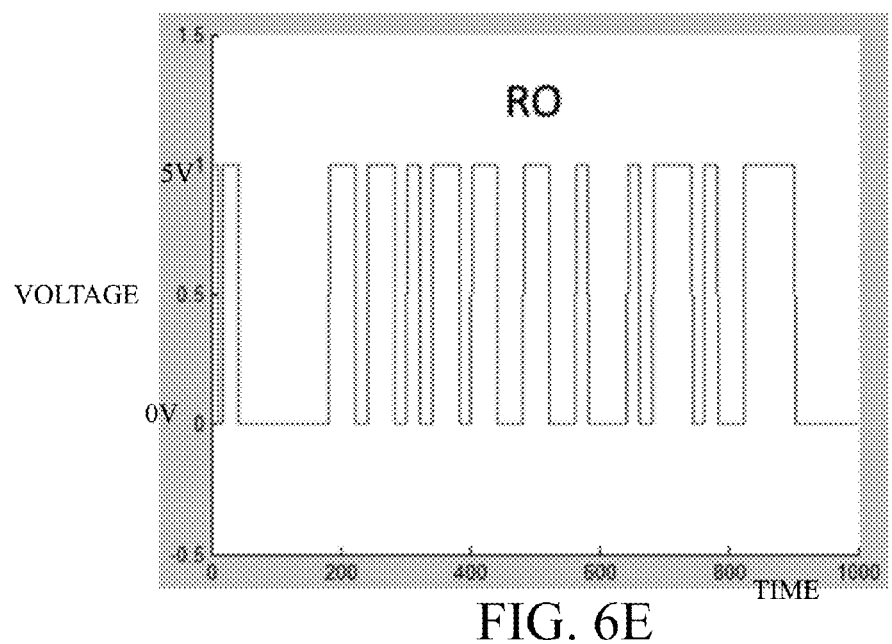
FIG. 6E is a non-limiting, exemplary illustration of an output thereof in accordance with one or more embodiments of the present invention.

FIG. 6D is the actual processing of the input differential pair signals 514a and 514b internal to the differential amplifier 301, and FIG. 6E is the actual output RO, which is a high and low logic level signals (0V and 5V) that mimic DMX signals for control of the programmable apparatus 104, but at a slower rate (e.g., 9600 baud). In the non-limiting, exemplary instance illustrated, signal 514a (shown in FIG. 4C-1) may be input to terminal "A" of DMX receiver (FIG. 6C) and its differential signal 514b may be input to terminal "B." It should be noted that at input terminal A and B, analog signal 514a and or 514b mimic DMX signals for control of the programmable apparatus 104, with the high and low logic levels masking the analog signal (i.e., analog nature) of the audio signal and casting it as "digital-like" analog signal and hence, generating a pseudo-digital, but analog signal that contains DMX signaling information. The DMX signaling information at A and B terminals are at a slower baud rate (e.g., 9600 baud) and lower voltage (e.g., −1 to +1 Volts) compared to actual DMX signaling. As indicated above, use of DMX signaling is only an example and therefore, other protocols may also be implemented.

It should be noted that with single-ended transmission, D− terminal would output the constant voltage (e.g., GND) and D+ would have the fluctuating voltage, with the DMX differential amplifier 301 outputting the differential between the two. It should further be noted that transmitting a single voltage level from audio jack or USB may be directly input into the serial port (UART 320) of the CPU 302, bypassing the DMX receiver 306 (and hence, the differential amplifier 301). In other words, the UART 320 may instead directly receive the transmitted signals 514a as a single-ended transmission.

Figure 7A:
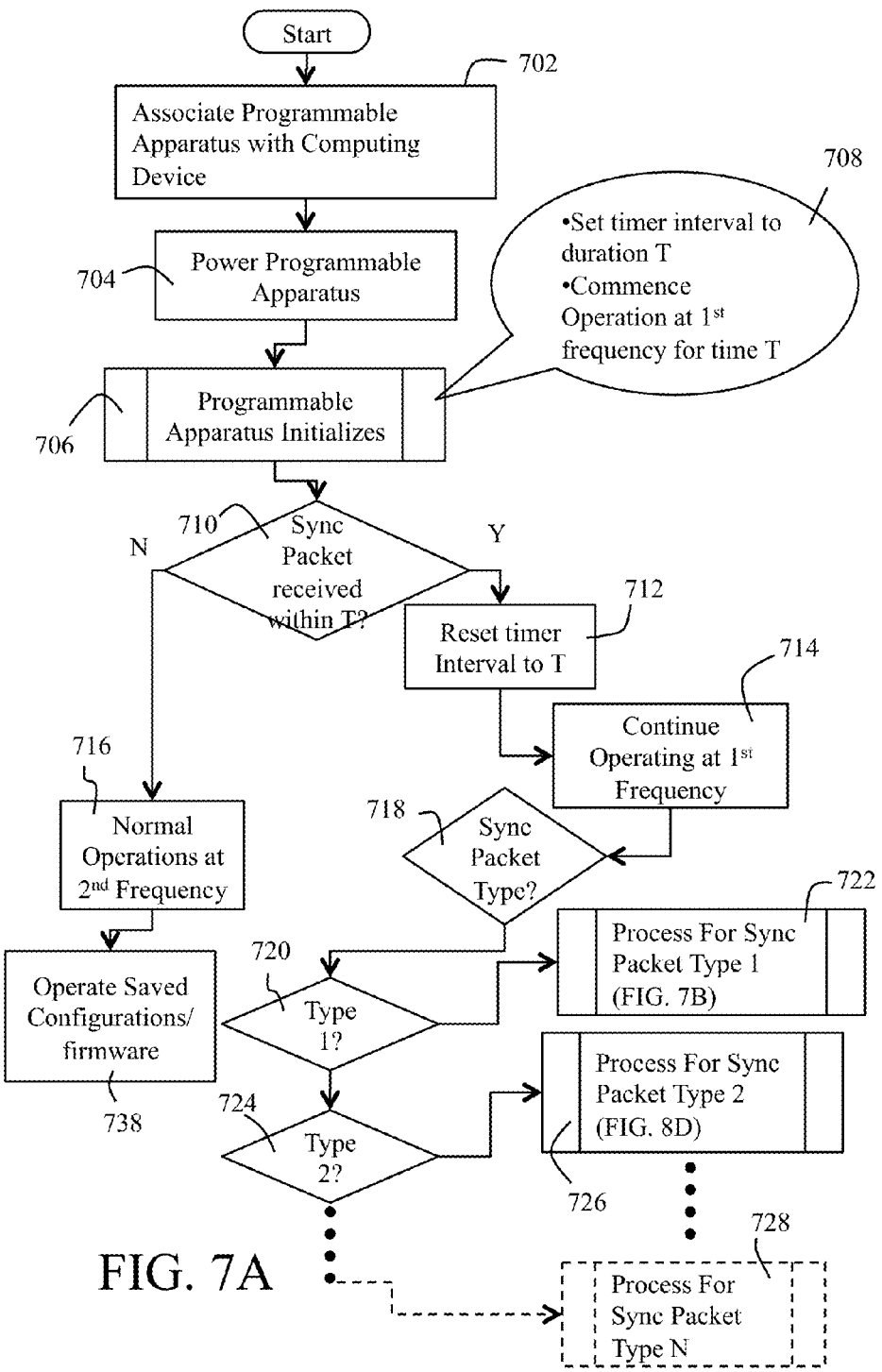
FIGS. 7A and 7B are non-limiting, exemplary flowcharts that illustrate processing of received control signals by the programmable apparatus in accordance with one or more embodiments of the present invention.
Figure 7B:
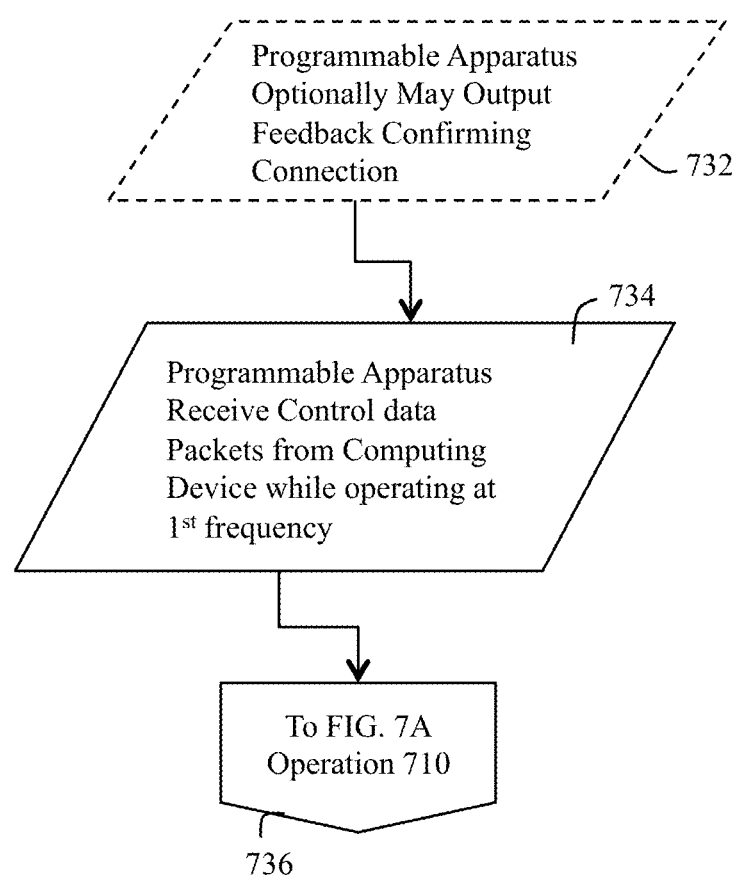

FIGS. 7A and 7B are non-limiting, exemplary flowcharts that illustrate processing of received control signals by the programmable apparatus in accordance with one or more embodiments of the present invention. As illustrated in FIG. 7A, at operation 702 programmable apparatus 104 is associated with computing device 102 in accordance with operations 450, which lead to operation 704 where programmable apparatus 104 is powered.

More specifically, as indicated above, sync packets are generated and transmitted at operations 330 or 448 by computing device 102 and received by CPU 302 of programmable apparatus 104, which enable CPU 302 to initialize UART 320 at operation 706 by setting a timer to a predetermined time period and enabling commencement of UART operations at a first frequency (e.g., by setting Speed Baud Rate Generator (SPBRG) register of the UART to a desired value) for duration of the set predetermined time period of the timer. It should be noted that CPU 302 may optionally initialize UART 320 to operate at a fixed, first frequency that does not expire after a predetermined time period and hence, the timer scheme would not be required. At operation 710, CPU 302 determines if a sync packet is received from the connected computing device 102 within that set predetermined time.

If CPU 302 determines that a sync packet is received within the predetermined time interval (at operation 710), CPU 302 at operation 712 resets duration of the time period of the timer to the predetermined time interval, and at operation 714 continues operating and maintaining the UART operations at the first frequency. CPU 302 determines at operation 718 a type of sync packet received (e.g., configuration control, firmware control, etc.) with the sync packet type determined and identified at operations 720, 724, etc. and control signal type processed in accordance with the sync type received at operations 722, 726, etc.

If CPU 302 at operation 710 determines that no sync packet is received within the predetermined time (assuming a frequency setting is not fixed), CPU 302 at operation 716 resets the UART 320 to operate at a second, normal operating frequency. There are many reasons why sync packets may not be received on time or at all, for example, transmission of data may be fully completed or the user may have detached programming apparatus 104 from computing device 102, etc. Regardless of the reasons for not receiving sync packets, if at operation 710 CPU 302 determines that no sync packet is received within the time set, programmable apparatus 104 via CPU 302 is switched to operate in normal mode of frequency and function in accordance with its saved configuration/firmware control (operation 738). For example, if programmable apparatus 104 as the intelligent micro-spotlight was configured to blink a red color light (e.g., latest configurations and or firmware control scheme saved), then at operation 738 programmable apparatus 104 will simply blink red color light, and receiving signals at a frequency set at operation 716. Stated otherwise, the actual function and operation of light output does not actually operate at the second frequency, only the UART baud rate.

Predefined operations 722, 726, etc. are summarily illustrated in FIGS. 7B for configuration control and 8D for firmware control (detailed below). That is, the predefined operations 722, 726, etc. for respective sync packet type 1, sync packet type 2, etc. may exemplarily be associated with respective configuration control, firmware control, etc. for example. As illustrated in FIG. 7B, the programmable apparatus 104 may optionally output a feedback (confirmation) signal, acknowledging establishment of a communication link (as detailed above) at operation 732. It should be noted that for configuration control (with generic configuration control sync packets shown in FIG. 4B-1), operation 732 is not required. Regardless, CPU 302 of programmable apparatus 104 at operation 734 receives the control data (e.g., configuration control packet) output from the differential amplifier 301, an exemplary output RO of which is illustrated in FIG. 6E as an exemplary control data packet while programmable apparatus 104 continues to operate at the first frequency. For example, when a user moves a GUI icon sliding bar 422 (FIG. 3B-4) to change color of the light from the LED of programmable apparatus 104, that change in color takes place at operation 734 where data generated as a result of moving GUI icon sliding bar 422 is received by CPU 302, executed at operation 734, and change of color in accordance with operation 734 is observed.

To continue with FIG. 7B, after operation 734, CPU 302 directs operation to operation 710 as indicated by the OFF page connector 736, where the loop is repeated and CPU 302 reads other control packets (configuration, firmware, etc.) received from computing device 102 at operation 734. For example, actually executing further instructions received due to further manipulations of GUI icons on computing device 102. Once completed and no more sync packets are received within a predetermined time (as determined by operation 710), operation 738 is executed in accordance with input frequency set at operation 716. That is, assuming a successful transmission, CPU 302 has received all control data at the first input frequency and is fully updated and reverts back to normal operations with all the new control data, operating at a second input frequency, executing all control data saved in memory as a standalone device or one connected to some console operating at the second frequency.

FIGS. 8A to 8D are non-limiting, exemplary illustrations a controller application for firmware-control in accordance with one or more embodiments of the present invention. Firmware-control system and method illustrated in FIGS. 8A to 8D include similar corresponding or equivalent aspects, features, components, interconnections, functional, operational, and or cooperative relationships as configuration-control system and method that are shown in FIGS. 1 to 7B, and described above. Therefore, for the sake of brevity, clarity, convenience, and to avoid duplication, the general description of FIGS. 8A to 8D will not repeat every corresponding or equivalent aspects, features, component, interconnections, functional, operational, and or cooperative relationships that has already been described above in relation to configuration-control system and method shown in FIGS. 1 to 7B.

As indicated above, although both configuration control and firmware change control may be disclosed as part of controller application 110 for one or more embodiments of the present invention, the firmware change control may be instead implemented as a standalone application, separate from configuration control. In other words, one or more embodiments of the present invention may be comprised of controller application 110 that only includes configuration control without firmware change control, and one or more embodiments of the present invention may be comprised of controller application 110 that only includes firmware change control without configuration control. FIGS. 8A to 8D are non-limiting, exemplary illustration that detail controller application 110 with firmware-control (which may be implanted as standalone or combined with configuration-control).

Figure 8A:
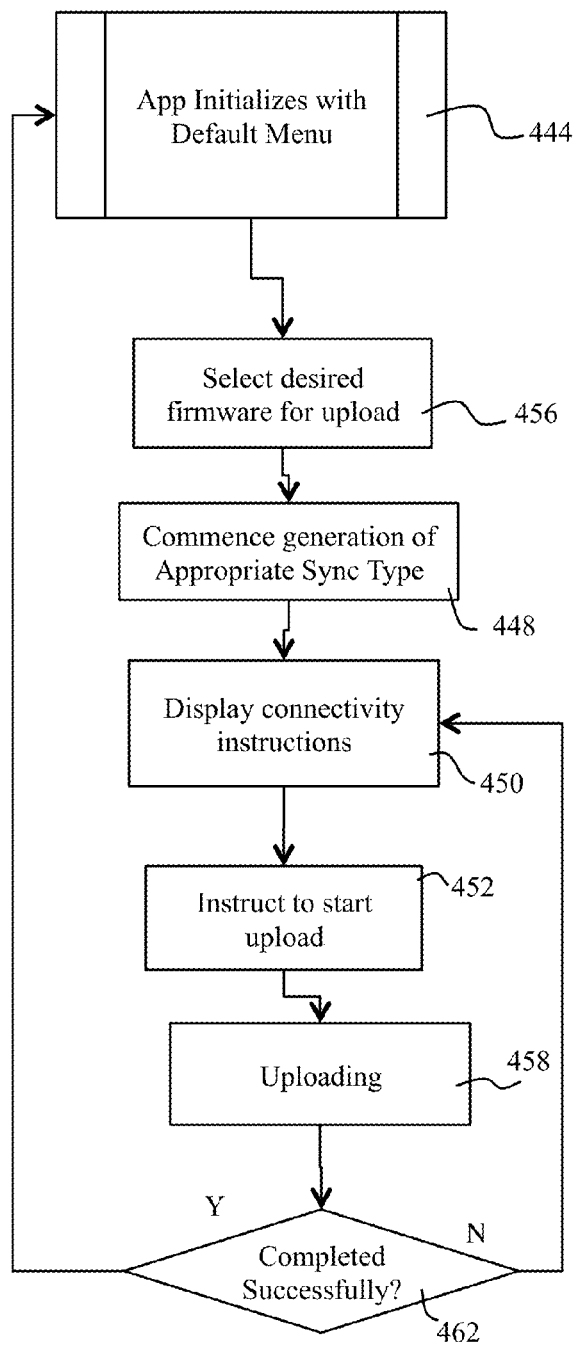
FIGS. 8A to 8D are non-limiting, exemplary illustrations a controller application for firmware-control in accordance with one or more embodiments of the present invention.
Figures 3, 8B:
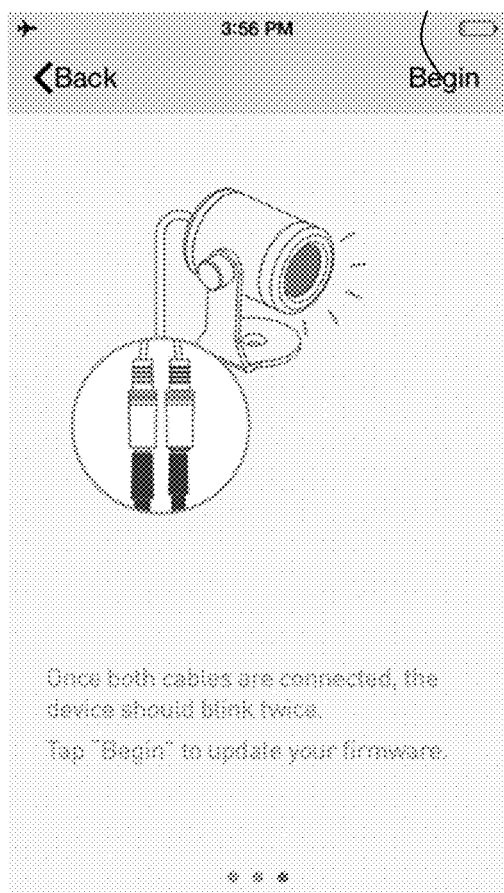
Figures 4, 8B:
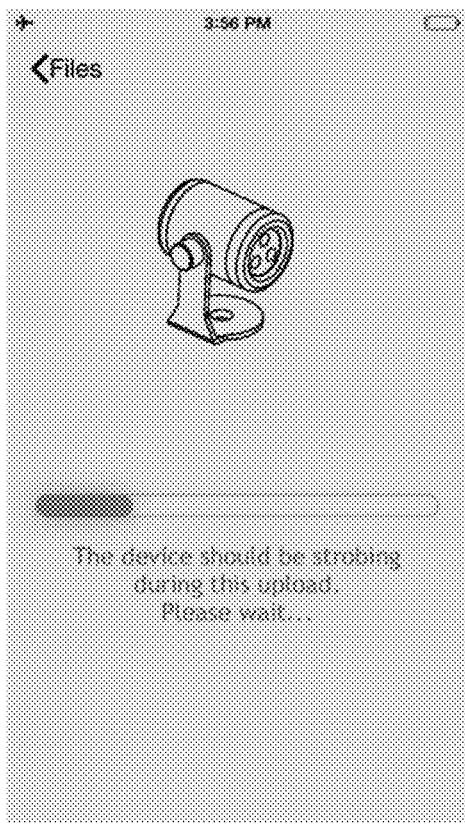

FIG. 8A is non-limiting, exemplary illustrations of a flowchart for firmware change/update for a programmable apparatus using a computing device in accordance with one or more embodiments of the present invention. FIGS. 8B-1 to 8B-5 are non-limiting, exemplary illustrations of screenshots for firmware control for an exemplary programmable apparatus 104 such as intelligent micro-spotlight connected to the computing device 102.

As illustrated in FIG. 8A (similar to that of FIG. 3A), upon launching of controller application 110 (for firmware control) within computing device 102, controller application 110 initializes at operation 444 and displays default menu 802 for firmware control via I/O module 160 (best illustrated in FIG. 8B-1). A non-limiting, exemplary illustration of a default menu (a main navigational GUI display screen 802) displayed at operation 444 for firmware control is illustrated in FIG. 8B-1. Main navigational GUI display screen 802 provides a central navigation to a firmware listing 806 for programmable apparatuses, including enabling a quick method to retrieve and view various saved firmware 804 for a particular programmable apparatus 104 by a mere selection of the firmware GUI 804 from the main navigational GUI display screen 802. It should be noted that a single programmable apparatus 104 may include several firmware versions in listing 406.

Upon selection of the desired firmware 804 for firmware control, controller application 110 via microprocessor unit 166 of computing device 102 commences generation of appropriate sync packet (detailed below) at operation 448 and outputs connectivity display at operation 450 (FIG. 8B-3). It should be noted that operation 450 may be executed before operation 448 or vice versa (in fact, from the end-user view point, operations 448 and 450 occur generally simultaneously). It should further be noted that sync packets are continuously generated by the controller application via the computing device 102 even if nothing is physically plugged to the computing device 102. It should further be noted that unless there is a mechanical switch (as present on many audio ports) that detects insertion of plug, then the generated sync packet signal can be transmitted only when plug is inserted. As detailed above and further below, the type of sync packet generated depends on the type of control desired (e.g., configuration change, firmware change, or others) and the selected apparatus type.

In the non-limiting, exemplary instance of FIG. 8A where application controller 110 is used to modify a firmware of programmable apparatus 104, acknowledgment of connectivity is important. Accordingly, if programmable apparatus 104 successfully recognizes the firmware control sync packet during the initialization of programmable apparatus 104 (detailed below), programmable apparatus 104 will notify users with an indication of acknowledgement of connection and receipt of sync packet such as for example, with a particular output of light sequence from LED. That is, the programmable apparatus 104 (as the exemplary intelligent micro-spotlight) may blink twice, with the user actually observing the blinking to confirm full communication by selecting an "OK" GUI icon at operation 452 (FIG. 8A) to proceed to firmware control at operation 458 for actual uploading of the firmware 804 from device 102 to apparatus 104. In fact, programmable apparatus 104 as the exemplary intelligent micro-spotlight may further provide a different sequence of lighting and or color scheme, which may be an indication that the firmware is being updated and yet another set of lighting and or color scheme that indicates if the firmware update was successful. Confirmation may be provided to users by combinations of other schemes and mechanisms such as changes in display settings or audible sounds (e.g., change of a digital clock display and sounding of its audible alarm).

As indicated above, one or more embodiments of the present invention provide the capability to field upgrade (or change) a built-in firmware of a programmable apparatus 104 using computing device 102. Most programmable apparatuses 104 include a default or previously installed firmware, which in accordance with one or more embodiments of the present invention may be field updated with a new firmware for a variety of reasons in accordance with one or more embodiments of the present invention, which may include fixing programming bugs or adding or modifying features or functionalities to the programmable apparatus.

In order to update or change the firmware of a programmable apparatus 104, a new firmware may be downloaded to the computing device 102 (e.g., via Internet connection to a website that includes a variety of different types of firmware for a specific type of programmable apparatus). It should be reemphasized that firmware control should not be limited to only intelligent micro-spotlight firmware but is easily applicable to modify firmware or other software applications of most programmable apparatuses that have a firmware or other software applications and include a physical interface port. For example, firmware/software applications in a programmable apparatus such as a consumer appliance or a digital clock with a physical interface port may be updated or changed without modifications (if any) in accordance with one or more embodiments of the present invention as detailed below.

As best illustrated in FIGS. 8B-1 and 8B-2, new firmware may be added to the listing 806 by using the Add GUI icon 810, which would render the download GUI display 812 shown in FIG. 8B-2. Once the new firmware is downloaded and saved within computing device 102, controller application 110 may be used to commence firmware update operations for programmable apparatus 104 as indicated above in relation to FIG. 8A.

Figures 1, 2, 5, 8B, 8C:
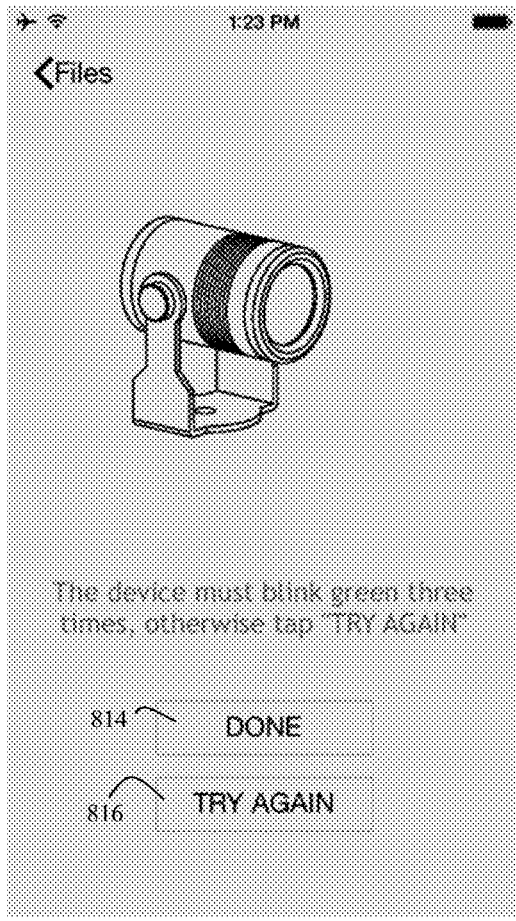

Upon selection of the desired firmware at operation 456, controller application 110 via microprocessor unit 166 of the computing device 102 commences generation and transmission of appropriate sync packet (e.g., firmware control sync packet as illustrated in FIG. 8C-1) at operation 448. In the non-limiting, exemplary instance of firmware control, one or more embodiments of the present invention intentionally sequence generation and transmission of appropriate sync packets at operation 448 after operation 456 so that an existing firmware within the connected programmable apparatus 104 is not accidentally modified by an incorrect firmware (firmware intended for an incompatible programmable apparatus hardware). In the exemplary instance of configuration control, various profiles may be interchangeable and hence, the lack of requirement for a strict sequencing (as evident from FIG. 3A). However, in the exemplary instance of firmware control, an update of an existing firmware of programmable apparatus 104 with an incorrect firmware may potentially make the programmable apparatus inoperable. Accordingly, generation and transmission of appropriate sync packet (e.g., firmware control sync packet) at operation 448 is sequenced after operations 456 to ensure correct data transmission.

Upon selection of the desired firmware to be uploaded at operation 456 (including commencement of the appropriate sync packet transmissions at operation 448), the controller application 110 displays a set of connectivity instructions for connecting the programmable apparatus 104 to the computing device 102 at operation 450 (FIG. 8B-3). As with the configuration control, the appropriate sync packets are continuously generated by the controller application via the computing device 102 even if nothing is physically plugged to the computing device 102. The sync packet generated depends on the type of control desired (configuration change, firmware change) and the selected apparatus type. If programmable apparatus 104 successfully recognizes the appropriate sync packet during programmable apparatus initialization, it will notify the user with an indication of acknowledgement of connection and receipt of appropriate sync packet such as for example, with a particular output of light sequence from LED (as indicated above). As indicated above, each operation (e.g., acknowledgement of appropriate sync packet, uploading of firmware, and successful completion thereof) may have different types of indications that may be observed by users. At operation 452, upon confirmation that the appropriate sync packet is recognized by the programmable apparatus 104 (confirming establishment of link between devices), the controller application 110 displays GUI for commencement of firmware control (such as a "Begin" GUI icon 814 shown in FIG. 8B-3 for users to actuate to commence upload of firmware). Thereafter, at operation 458, firmware uploads (FIG. 8B-4). If the appropriate sync packet is not recognized (e.g., due to mismatch of device ID, detailed below), the programmable apparatus would not acknowledge and would ignore the transmitted sync packets. After completion of upload process at operation 458, users determine if the upload is successful and if so, users may select a "Done" GUI icon 814 (FIG. 8B-5) in which case microprocessor 166 via controller application 110 at operation 462 re-initializes at operation 444. However, after completion of upload process at operation 458, if users determine the upload was not successful, users may select a "Try Again" GUI icon 816, in which case application controller 110 directs operations to operation 450, where connectivity instructions are redisplayed to recommence uploading process.

FIG. 8C-1 is a non-limiting example of a distinct sync packet in accordance with one or more embodiments of the present invention wherein controller application 110 may include configuration and or firmware control. As indicated above, distinct sync packets may be generated upon selection of firmware. Distinct sync packets are formatted to include a header that has a specific sequence of bytes that identifies the packet as a sync packet, a payload that has specific sequence of bytes that identifies a type of the distinct sync packet (e.g., a configuration, addressing, firmware control, etc.), and a trailer that contains error checking data such as the well known checksum error checking scheme. In general, the distinct sync packets are generated for firmware control (but may also be equally applicable for configuration control). The header of distinct sync packets further includes a programmable apparatus identification (or ID), which transmits information (e.g., identification information) about the exact programmable apparatus 104 for which the distinct sync packet is intended, which prevents communication of incorrect data with the wrong programmable apparatus. If there is no match between the programmable apparatus ID information in the header of the distinct sync packet and that of the actual ID of the programmable apparatus, then the entire distinct sync packet signal is ignored by the programmable apparatus 104. Further, the programmable apparatus 104 simply resumes normal operations. The scheme implemented protects programmable apparatus 104 from upload of incorrect firmware that is incompatible with its hardware.

FIGS. 8C-2 is non-limiting example of a distinct control packet in accordance with one or more embodiments of the present invention wherein controller application 110 may include configuration and or firmware control. As illustrated indicated above, distinct control packets are generated as a result of input received by the controller application 110. The distinct control packets are formatted to include a header that identifies the packet as a control packet, a payload that includes control data (actual data for configuration and or firmware control), and a trailer that contains error checking data such as the well known checksum error checking scheme. In general, the distinct control packets are generated for firmware control (but may also be equally applicable for configuration control). It should be noted that one or more embodiments of the present invention include a programmable apparatus ID information within the firmware being uploaded. In other words, the firmware data transmitted as the distinct control packets include programmable apparatus ID information within the header that must match the device ID. Once matched, the firmware data transmitted is saved within the storage module of programmable apparatus, replacing or modifying the original firmware.

Figure 8D:
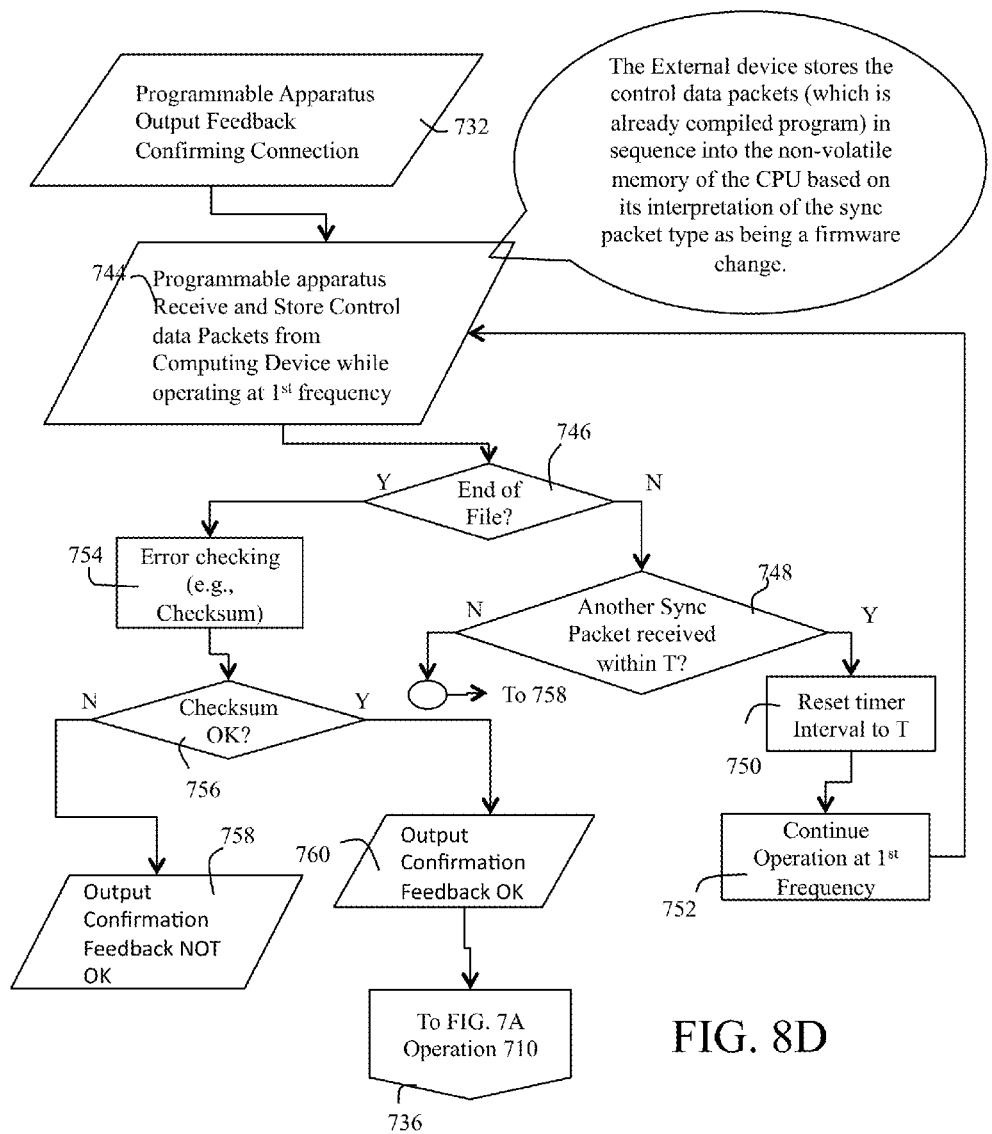

As illustrated in FIG. 7A, the predefined operation 726 for a sync packet type 2 may, for example, be associated with a firmware control. The details of operation 726 are shown in FIG. 8D, where programmable apparatus 104 outputs a feedback (confirmation) signal, acknowledging establishment of a communication link (as detailed above) at operation 732. It should be noted that for firmware control (with distinct sync packets shown in FIG. 4C-1), operation 732 is required. Programmable apparatus 104 at operation 744 receives and stores the control data (new firmware) while programmable apparatus 104 continues to operate at the first frequency.

At operation 746, CPU 302 of programmable apparatus 104 determines if the End Of File data has been received. If CPU 302 determines that no end of file data is received, at operation 748, CPU 302 determines if another sync packet is received within the predetermined time T and if so, at operation 750 the timer is reset to T and at operation 752 programmable apparatus 104 is maintained to function at the first frequency while receiving more firmware control data packets at operation 744.

If at operation 748 it is determined that no sync packet is received (while still not the end of file), programmable apparatus 104 via CPU 302 outputs an error confirmation at operation 758. There are many reasons why sync packets may not be received on time or at all, for example, transmission of data may be corrupted or the user may have detached programming apparatus 104 from computing device 102, etc. Otherwise, if at operation 746 CPU 302 receives an end of file data, error checking operations is conducted at operation 754. If the CPU 302 determines an error at operation 756, the programmable apparatus outputs an error confirmation at operation 758. At this stage, users may restart the entire upload process (as indicated in FIG. 8A). If the CPU 302 determines no error at operation 756, programmable apparatus 104 outputs a positive confirmation at operation 760, where the entire process is handed to operation 710 in FIG. 7A, with programmable apparatus 104 reverting to normal frequency operations at 716. In this instance, operation 738 will enable CPU 302 to execute the newly saved firmware application.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A system for communication and control between incompatible devices, comprising:
    a first device that operates in accordance with a first protocol and serially transmits unidirectional stream of sync signals and control signals in accordance with the first protocol;
    a second device that generally operates in accordance with a second protocol that is different from the first protocol, but commences operations in accordance with the first protocol upon establishment of a direct physical link between the first and the second devices and receipt of the sync signals, which enables the first device to control the second device with the control signals in accordance with the first protocol;
    the second device commences operations in accordance with the first protocol without hardware modifications of the first or second devices and without dedicated hardware; and
    the second device reverts to operating in accordance with the second protocol upon severing of the physical link between the first and second device, with data of the second device modified by the control signals of the first device.

2. A system for communication and control between incompatible devices as set forth in claim 1, wherein:

the control signals include the data with respect to one or more of address, configuration, or firmware modifications for the second device.

3. The system for communication and control between incompatible devices as set forth in claim 1, wherein:
the control signals generated in accordance with the first protocol have a first signal format, including first frequency and first voltage level, with the second device generally operating in accordance with the second protocol that requires a second signal format, including second frequency and second voltage level.

4. The system for communication and control between incompatible devices as set forth in claim 3, wherein:
the first or second signal formats are one of analog or digital signal formats.

5. The system for communication and control between incompatible devices as set forth in claim 1, wherein:
control signals are transmitted using one of differential, single-ended, or multi-differential, or multi-single-ended signaling.

6. The system for communication and control between incompatible devices as set forth in claim 1, wherein:
the link is established by a direct, physical connection between the first and second device physical interfaces.

7. The system for communication and control between incompatible devices as set forth in claim 5, wherein:
the physical interfaces are physical ports.

8. A system for communicating with and for controlling of devices, comprising:
a computing device that has a physical interface;
the computing device generates and serially transmits unidirectional stream of signals through the physical interface using differential signaling at a first frequency, resulting in a differential signal pair;
the differential signal pair generated is transmitted using differential transmission to a device that normally operates at a second frequency but commences operation at the first frequency upon being wire connected to the physical interface of the computing device but without hardware modifications of the computing device or the device and without dedicated hardware;
the device initially operates at the first frequency and continues to maintain operation at the first frequency while receiving the differential signal pair at the first frequency, with the device controlled by the computing device;
the device reverts to independent operations and operating at the second frequency upon severing of link from the computing device.

9. The system for communicating with and for controlling of devices as set forth in claim 8, wherein:
the first frequency is less than an operational frequency of the device.

10. The system for communicating with and for controlling of devices as set forth in claim 8, wherein:
the physical interface of the computing device is a physical interface port.

11. The system for communicating with and for controlling of devices as set forth in claim 8, wherein:
the signals generated by the computing device are one of digital and analog signals.

12. The system for communicating with and for controlling of devices as set forth in claim 11, wherein:
the analog signals are pseudo digital signals.

13. The system for communicating with and for controlling of devices as set forth in claim 12, wherein:

the analog pseudo digital signal includes signal edges that are generated using one or more sampling set points.

14. The system for communicating with and for controlling of devices as set forth in claim 13, wherein:
the one or more sampling set points are sampled between positive and negative voltage maximum values defining the signal edge.

15. The system for communicating with and for controlling of devices as set forth in claim 8, wherein:
the physical interface is one of an audio, Universal Serial Bus (USB), or XLR port.

16. The system for communicating with and for controlling of devices as set forth in claim 14, wherein:
the device includes a receiver that has a differential amplifier that generates an output signal of the received differential signal pair.

17. The system for communicating with and for controlling of devices as set forth in claim 16, wherein:
the differential amplifier includes:
an inverting input that receives one of a first or a second of the differential signal pair;
a non-inverting input that receives another of the second or the first of the differential signal pair; and
an output that generates the output signal;
with the first signal of the differential signal pair and the second signal of the differential signal pair being complementary signals.

18. The system for communicating with and for controlling of device as set forth in claim 17, wherein:
a first output signal of the differential amplifier is generated when a difference between a first and a second of the differential signal pair with a first polarity is greater than a threshold voltage; and
a second output signal of the differential amplifier is generated when a difference between the second and the first of the differential signal pair of a second polarity is greater than the threshold voltage;
wherein: one of the first or the second output signal of the differential amplifier is registered as a high logic level signal, and the other of the second or the first output signal of the differential amplifier is registered as a low logic level signal.

19. The system for communicating with and for controlling of device as set forth in claim 8, wherein:
the device normally operates at the second frequency, which is different from the first frequency.

20. The system for communicating with and for controlling of device as set forth in claim 17, wherein:
the device includes a Central Processing Unit (CPU) that receives the registered high and low logic level signals for control of the device.

21. The system for communicating with and for controlling of device as set forth in claim 20, wherein:
the CPU of the device includes a Universal Asynchronous Receiver Transmitter (UART) that is initialized to commence operations at the first frequency and continue to maintain operation at the first frequency while receiving a sync signal from computing device within a predetermined time, which enables the device to receive the high and low logic levels signals.

22. The system for communicating with and for controlling of device as set forth in claim 17, wherein:
the control signals are received as control data packets; and
one or more control data packets and one or more sync packets are transmitted serially as a stream of packets, with at least one sync packet transmitted within the predetermined time interval.

23. The system for communicating with and for controlling of device as set forth in claim 21, wherein:
the UART is switched to the second frequency when sync packet is not received within the set predetermined time interval.

24. The system for communicating with and for controlling of device as set forth in claim 11, wherein:
the computing device includes a Graphic User Interface (GUI) that enables input of control data.

25. The system for communicating with and for controlling of device as set forth in claim 11, wherein:
Launching a Graphic User Interface (GUI) for input of control data commences generation of sync packets.

26. A method for communication and control between incompatible devices, comprising:
a rate of transmission of communication and control signal packets in accordance with a first protocol comprised of a first frequency of a first device; and
unidirectional, serial transmitting of the communication and control signal packets at the first frequency, but at voltage levels in accordance with hardware signaling requirements of a second device to thereby establish communication and control between incompatible devices without hardware modification and without a dedicated hardware.

27. A system for communication and control between devices, comprising:
a first computing device that controls a second computing device;
the first computing device includes an audio output port that generates and serially transmits unidirectional analog audio signals;
the second computing device has a digital input port;
a wired cable that physically links the audio output port of the first computing device with the digital input port of the second computing device;
the analog audio signals generated by the first computing device are transmitted from the audio port of the first computing device to the digital input port of the second computing device as pseudo digital analog control signals to control the second computing device;
wherein: the pseudo digital analog control signals are analog signals cast in a shape of a digital signal.

* * * * *